March 26, 1963  F. A. MORRIS  3,083,356
DATA TRANSMITTING AND RECORDING SYSTEM
Original Filed April 13, 1953  5 Sheets-Sheet 1

CLOCK & CALENDAR CIRCUIT-27
DATE AND TIME REGISTER CIRCUIT-28

INVENTOR
Frank A. Morris.
BY Francis E. Blake
Att'y

March 26, 1963     F. A. MORRIS     3,083,356
DATA TRANSMITTING AND RECORDING SYSTEM
Original Filed April 13, 1953     5 Sheets-Sheet 2

CLOCK & CALENDAR CIRCUIT-27
DATE AND TIME REGISTER CIRCUIT-28

INVENTOR
Frank A. Morris
BY
Francis E. Blake
Att'y

March 26, 1963  F. A. MORRIS  3,083,356
DATA TRANSMITTING AND RECORDING SYSTEM
Original Filed April 13, 1953  5 Sheets-Sheet 3

CLOCK & CALENDAR CIRCUIT - 27
SCANNING CIRCUIT - 29

INVENTOR
Frank A. Morris
BY
Francis E. Blake
Att'y

CLOCK & CALENDAR CIRCUIT - 27
SCANNING CIRCUIT - 29

INVENTOR
Frank A. Morris.

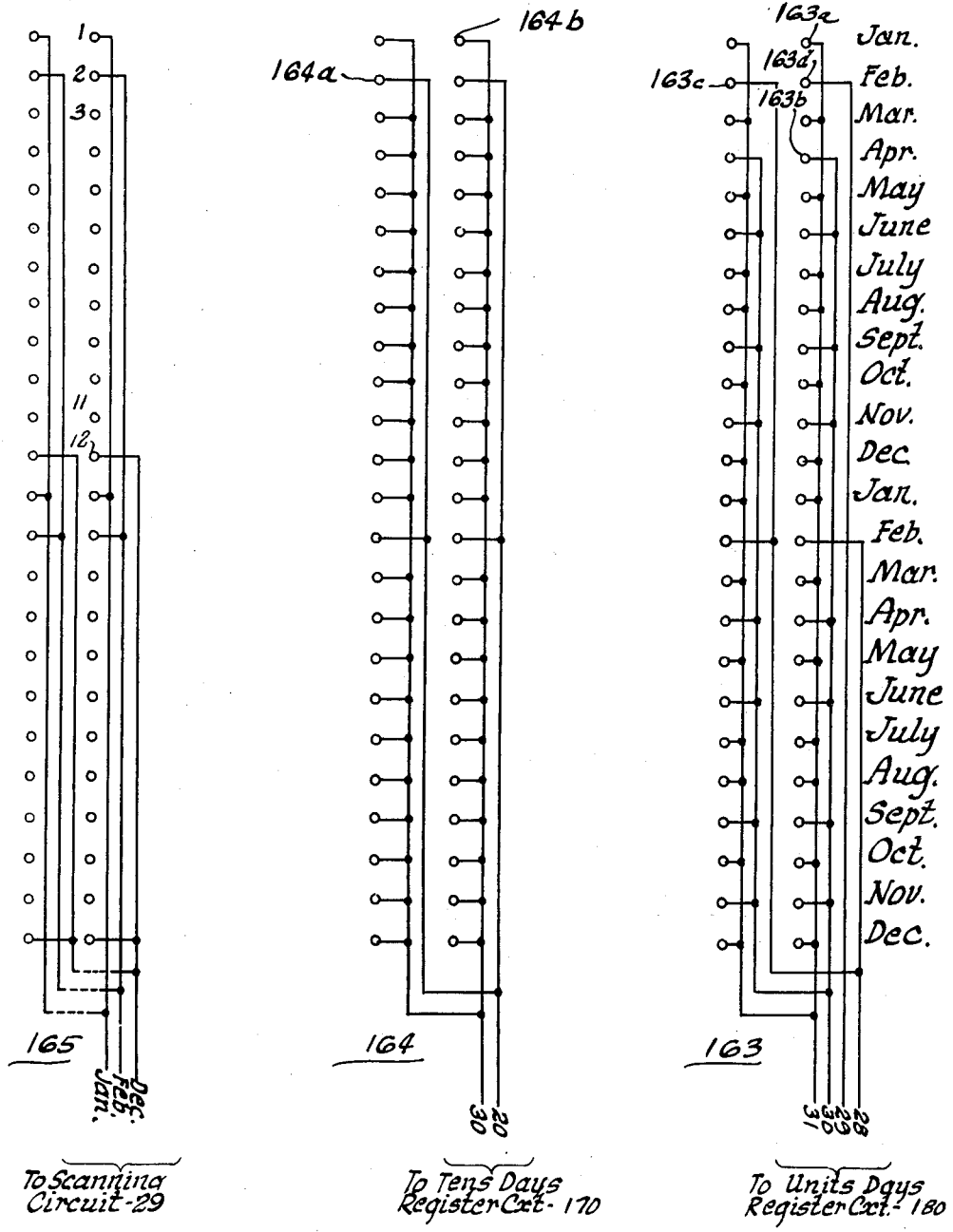

United States Patent Office 3,083,356
Patented Mar. 26, 1963

3,083,356
DATA TRANSMITTING AND RECORDING
SYSTEM
Frank A. Morris, Fishers, N.Y., assignor to General
Dynamics Corporation, Rochester, N.Y., a corporation
of Delaware
Original application Apr. 13, 1953, Ser. No. 348,202. Divided and this application Dec. 24, 1956, Ser. No. 630,382
22 Claims. (Cl. 340—174.1)

The present invention relates to a telephone system and, more particularly, to a system for automatically ticketing toll calls including a clock and calendar circuit for providing date and time information relating to a toll call. The present application is a division of a copending application of Frank A. Morris et al., Serial No. 348,202, filed April 13, 1953, now Patent No. 2,886,642.

An object of the present invention is to provide new and improved means for providing date and time information for use in an automatic toll ticketing system.

A further object is to provide date and time register means for providing a continuous indication of date and time.

A further object is to provide a new and improved clock and calendar circuit including date and time register means and means for simultaneously advancing one register means and restoring a selected register means to a normal setting.

Still a further object is to provide a clock and calendar circuit including means controlled by a months register circuit at the end of each month for setting a days register circuit to a condition representing the first day of the next succeeding month.

Another object is to provide a new and improved clock and calendar circuit comprising means for continuously manifesting date and time information and sending means controlled by the manifesting means for transmitting the date and time information.

Another object is to provide an improved data sending means.

Figure 1:
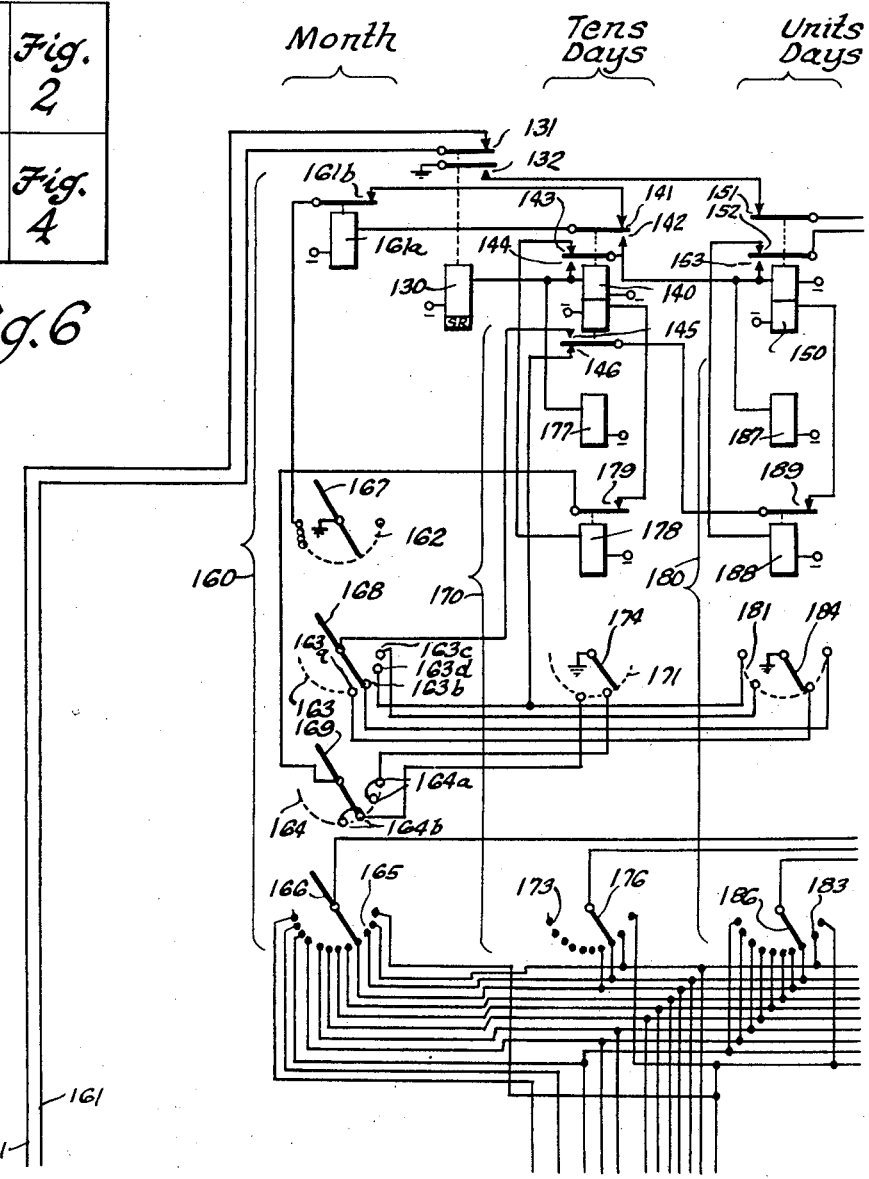
Figure 2:
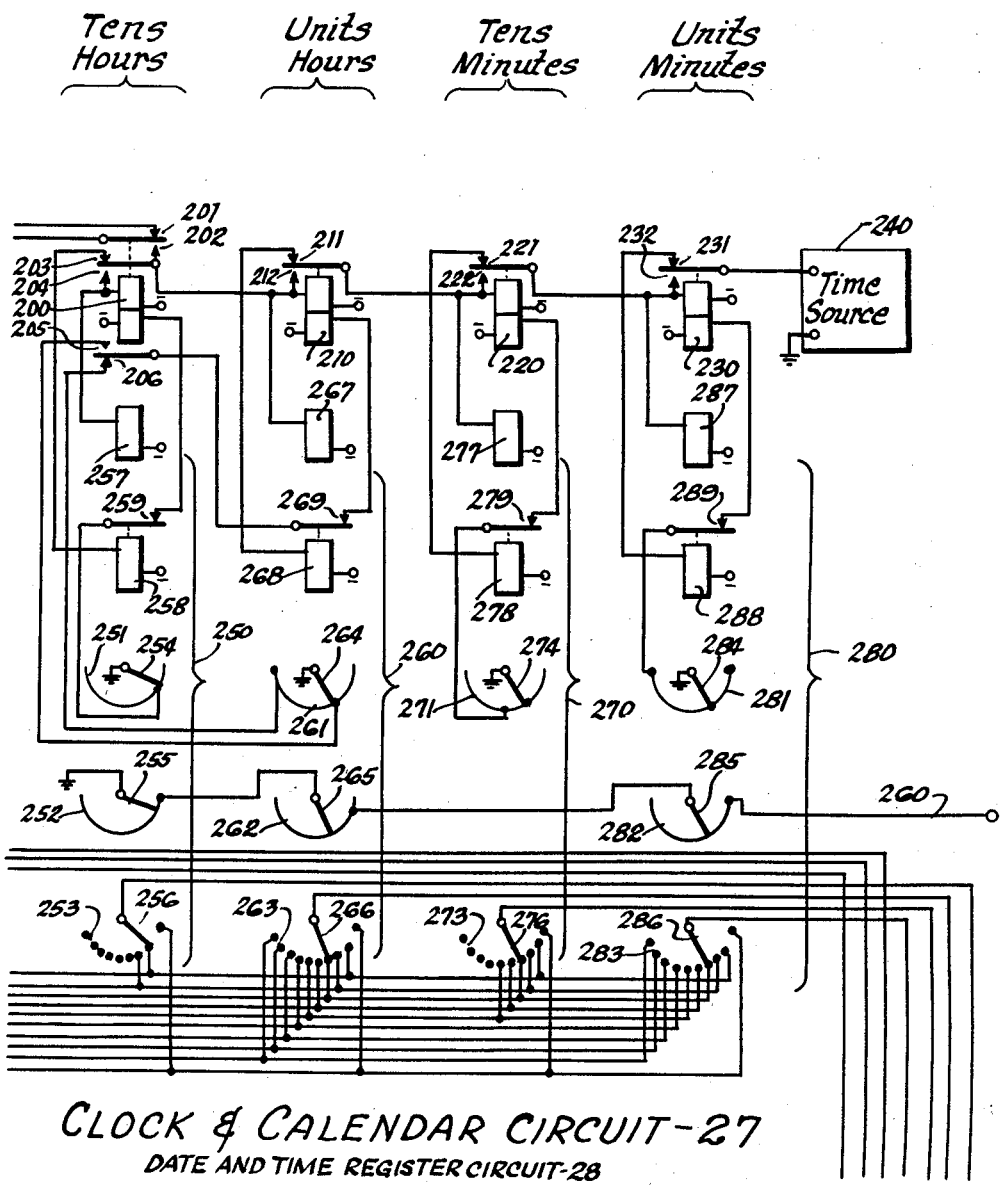
Figure 3:
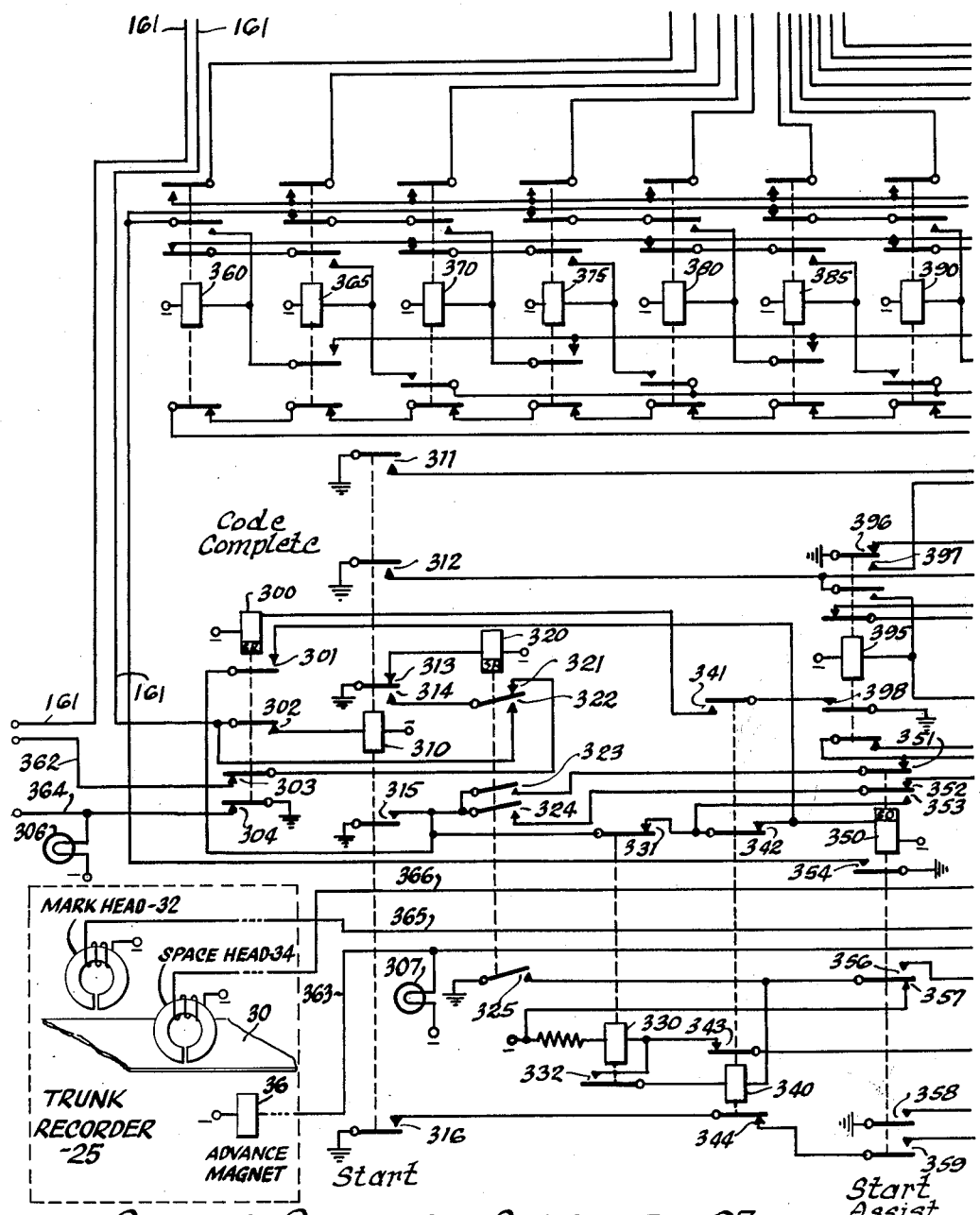
Figure 4:
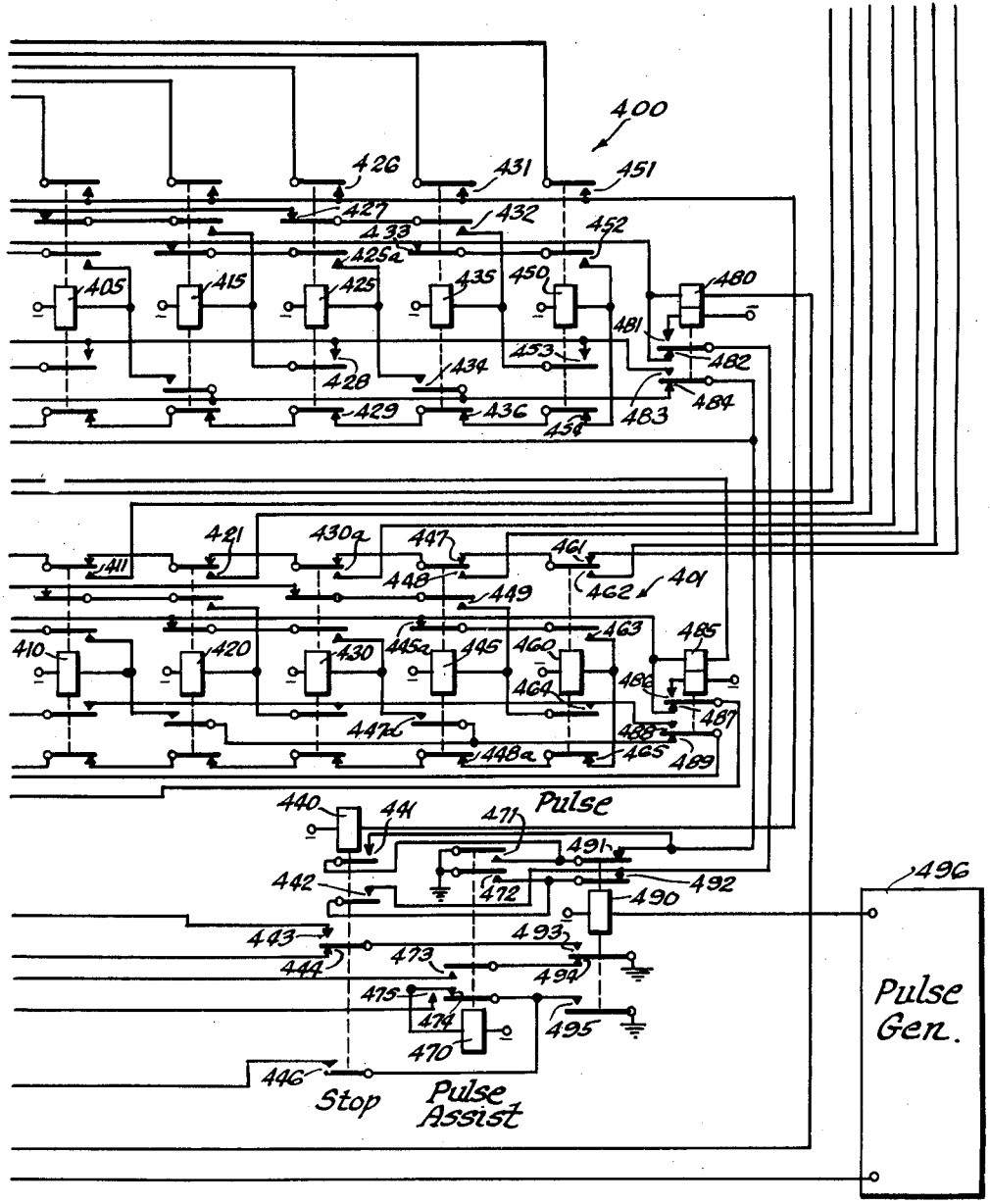

Other objects and advantages of the present invention will become apparent from the ensuing description of an illustrative embodiment thereof, in the course of which reference is made to the accompanying drawings, in which:

FIGS. 1 and 2 form a schematic diagram of a date and time register circuit comprising a part of a clock and calendar circuit which embodies the features of the present invention and which is adapted to be used in an automatic toll ticketing system;

FIGS. 3 and 4 form a schematic diagram of a scanning circuit included in the clock and calendar circuit;

FIG. 5 is a detailed view of the contact banks of a switch forming a months register circuit in the clock and calendar circuit; and FIG. 6 is a diagram illustrating the manner in which FIGS. 1-4 are positioned adjacent each other to form a complete circuit diagram of the clock and calendar circuit.

The present invention is directed to a clock and calendar circuit for use in automatic toll ticketing systems which may be of the type disclosed in the above-identified patent to Frank A. Morris et al. or of the many other types well known in the art. In a system of the type disclosed in the Morris et al. patent during the extension of a toll call from a calling subscriber to a called subscriber, line extending means, such as an adapter circuit or a trunk circuit, is seized to prepare circuits for extending the connection and to prepare circuits for recording data pertaining to the toll call in a trunk recorder 25 individually connected to the seized trunk or adapter circuit. The trunk recorder 25, which can be of the type disclosed in the copending application of Howard S. Gleason, Serial No. 378,209, filed September 3, 1953, now Patent No. 2,867,435, includes an endless loop of magnetic tape 30 (FIG. 3) adjacent to transversely spaced portions of which are disposed a mark pulse transducing head 32 and a space pulse transducing head 34. The trunk recorder further includes a step-by-step drive mechanism, which is actuated following the recording of either a mark pulse or space pulse by the related transducing head. The step-by-step drive mechanism is operated to advance the magnetic tape 30 a single step by an advance magnet 36 which is momentarily energized during data recording operations under the control of a common pulse repeater relay included in the associated trunk or adapter circuit.

During the extension of a toll call to the called subscriber, the trunk circuit is supplied with signals relating to the data to be collected and stored in conjunction with the toll call so as to selectively energize the mark and space transducing heads 32 and 34 and to intermittently energize the advance magnet 36. Some of these signals, such as those relating to the identification of the called subscriber, are provided by the dialing device at the calling substation whereas certain other signals such as those relating to the duration of the call and the date and time at which the call was placed, are generated by circuits associated with the trunk or adapter circuit. In the system disclosed in the above-identified Morris et al. patent, data is recorded on the magnetic tape 30 in the trunk recorder 25 by providing a series of mark pulses representing the digital value of the data to be stored and by providing a space pulse following each group of mark pulses to provide means for separating successive items of digital data. The advance magnet 36 is energized following the energization of either of the mark or space transducing heads 32 or 34 to provide a means for advancing the magnetic tape 30 to a position to receive the next pulse to be recorded.

The clock and calendar circuit of the present invention is utilized to provide date and time information to the trunk recorders representing the time and date at which the call was placed. In the above-identified Morris et al. patent, this date and time information is supplied at the release of the extended connection, although this information obviously could be provided in response to the receipt of answering supervisory signals or both at the beginning and at the end of the call. The clock and calendar circuit, comprising a date and time register circuit and a scanning circuit, is common equipment which is individually connected to one of the trunk or adapter circuits by a clock relay therein only at the time at which the date and time information is to be supplied to the trunk recorder 25. Following the completion of the transmission of the date and time information, which comprises seven groups of mark pulses representing the month, the tens and units days digits, the tens and units hours digits, and the tens and units minutes digits, the clock and calendar circuit is released to permit its association with another trunk or adapter circuit.

The clock and calendar circuit 27 (FIGS. 1 through 4) includes a date and time register circuit 28 which provides a continuous indication of the date and time of day. This information is selectively supplied to one of the trunk recorders by the scanning circuit 29 in response to the termination of a toll call so that, following the group of mark pulses representing the duration of the toll call, the magnetic tape 30 in the trunk recorder 25 is provided with seven groups of mark pulses representing the time and date at which this toll call is terminated. The clock and calendar circuit 27 is common to all of the one-way trunk circuits and their associated trunk recorders provided in a particular calling exchange. The date and time register circuit 28 also applies ground at a selected time to the playback control circuit to initiate a normal cycle of operation thereof as described in the Morris et al. patent.

More particularly, the date and time register circuit 28 includes a units minutes register 280, a tens minutes register 270, a units hours register 260, a tens hours register 250, a units days register 180, a tens days register 170 and a months register 160, which are intermittently and sequentially operated under the control of the time source 240. Each of these registers, with the exception of the months register 160, manifests a single digit in the respective denominational columns of the date and time notations provided by the clock and calendar circuit 27. The months register 160 provides an indication of the numerical designation of the month in which the toll call is completed, and includes means for not only manifesting the digit in the units denominational column, but also in the tens denominational column if the month is either October, November, or December, i.e., numerically designated 10, 11 or 12, respectively.

Specifically, the units minutes register 280 includes a steering relay 230, a "minor" switch having a reset magnet 287, a motor magnet 288, and wipers 284, 285 and 286, which engage contact banks 281, 282 and 283 respectively. The ground pulses provided by the time source 240, at one minute intervals, are applied through a pair of normally closed contacts 231 to operate the motor magnet 288. The operation of the motor magnet 288 opens a pair of contacts 289 and conditions the wipers 284, 285 and 286 for moving a single step. Assuming that the wipers 284, 285 and 286 are in engagement with the first contacts in the contact banks 281, 282 and 283, the termination of the first ground pulse from the time source 240 releases the motor magnet 288 to advance the wipers 284, 285 and 286 to the second contacts in the banks 281, 282 and 283 which are representative of an elapsed time of one minute. This sequential operation and release of the motor magnet 288 sequentially advances the wipers 284, 285 and 286 to engage the successively arranged contacts forming the contact banks 281, 282 and 284. In response to the receipt of the ninth ground pulse from the time source 240, the wipers 284, 285 and 286 are conditioned for advancement into engagement with the contacts manifesting the elapse of nine minutes or, numerically, the tenth contact in each of the contact banks 281, 282 and 283. When the motor magnet 288 is released to advance these wipers into engagement with the "9" manifesting contacts, the contacts 289 are closed so that ground is applied from the grounded wiper 284 through the "9" manifesting contact and the closed contacts 289 to the lower operating winding of the steering relay 230. In response to the application of ground to this operating winding, the relay 230 is operated to open the contacts 231 and close a pair of contacts 232.

The tenth pulse applied from the time source 240 is applied through the now closed contacts 232 to operate the reset magnet 287 so that the wipers 284, 285 and 286 are returned under spring action into engagement with the contacts manifesting "0," that is, the first contacts in the first contact banks 281, 282 and 283. The application of ground to the closed contacts 232 also energizes the upper operating winding of the steering relay 230 so that this relay remains operated when the wipers 284, 285 and 286 are returned to their home position in response to the operation of the reset magnet 287. When the ground pulse is terminated by the time source 240, the upper operating winding of the steering relay 230 is deenergized so that the relay 230 releases to reclose the contacts 231 and to open the contacts 232. The removal of ground from the contacts 232 permits the steering relay 230 to release inasmuch as, the movement of the wiper 284 to its normal home position removes ground from the lower operating winding of this relay.

Accordingly, the wiper 284 and the contact bank 281 cooperate to provide a means for resetting the units minutes register 280, in response to the receipt of ten ground pulses from the time source 240, thus indicating the completion of ten minutes. The wiper 286 selectively engages one of the contacts in the contact bank 283, which are designated "0" and 1-9, inclusive, when considered from right to left in FIG. 2, in accordance with the magnitude of the units minutes digit of clock time. The contact bank 283 is interconnected with the scanning circuit 29, so that the information manifested by the selective positioning of the wiper 286 is available to this circuit for subsequent transmission to the associated trunk recorder. The wiper 285 and contact bank 282 form a portion of a circuit for initiating a normal cycle of operation of the playback control circuit as described in the above referred to Morris application.

Simultaneously with the application of ground to the closed contacts 232, which ground represents the tenth pulse transmitted from the time source 240, this ground is also applied through a pair of normally closed contacts 221 to the operating winding of a motor magnet 278 forming a portion of the tens minutes register 270. In addition to the motor magnet 278, the tens minutes register 270 includes a steering relay 220, a reset magnet 277, and a pair of wipers 274 and 276 which selectively engage contacts in a pair of contact banks 271 and 273, respectively. In response to the receipt and termination of a ground pulse from the time source 240, representing the completion of ten minutes of elapsed time, the stepping magnet 278 is operated to move the wiper 274 from engagement with the first contact, manifesting "0" ten minutes, into engagement with the second contact in the contact bank 271 which manifests the digit "1." The operation of the stepping magnet 278 also opens a pair of interrupter contacts 279 controlled thereby.

This sequential operation of the stepping magnet 278 in response to the receipt of every tenth pulse applied to the units minutes register 280 continues until such time as five of these pulses are received by the motor magnet 278. In response to the completion of this fifth pulse, the wipers 274 and 276 are moved into engagement with contacts representing an elapsed time of 50 minutes. At this time, the grounded wiper 274 is connected to the lower operating winding of the steering relay 220, through the "5" representing contact in the bank 271 and the closed contacts 279. The application of ground to the operating winding of the steering relay 220 opens the contacts 221 and closes a pair of contacts 222. Thereupon, when the sixtieth pulse is generated by the time source 240, this is applied through the closed contacts 232, indicating nine units minutes have elapsed, and the closed contacts 222, indicating that fifty or five tens minutes have elapsed, to operate the reset magnet 277. The operation of the reset magnet 277 returns the wipers 274 and 276 into engagement with the first contact in the contact banks 271 and 273, representing "0." Simultaneously with the operation of the reset magnet 277, the sixtieth ground pulse generated by the time source 240 is applied to the operating winding of the reset magnet 287 in the units minutes register 280 to operate this magnet to reset the wipers 284, 285 and 286 to their normal home position representing "0" units minutes.

The contacts forming the contact bank 273 are designated "0" and "1" to "5," inclusive, when considered from right to left in FIG. 2, and the selective engagement of the wiper 274 with one of these contacts manifests the magnitude of the digit in the tens minutes denominational column in the notation of the time at which a call is terminated.

The units hours register 260 is energized in response to the resetting of the tens minutes register 270. More particularly, after the contacts 222 are closed in response to the generation of fifty pulses by the time source 240, the sixtieth ground pulse is applied through a pair of normally closed contacts 211 of a steering relay 210 in the units hours register 260 to operate a motor magnet 268. The motor magnet 268 in the units hours register 260 controls the sequential operation of a plurality of wipers 264, 265 and 266 which selectively and sequentially engage the contacts forming a plurality of contact banks 261, 262 and 263, respectively. The units hours register 260 also includes a reset magnet 267 which, when operated, returns the wipers 264, 265 and 266 to their normal home position in engagement with a contact representing "0" units hours.

The motor magnet 268 is operated to advance the wipers 264, 265 and 266, and to open a pair of interrupter contacts 269, simultaneously with the receipt of sixty pulses by the units minutes register 280 and the receipt of six pulses by the tens minutes register 270. The stepping magnet 268 is sequentially operated and released to advance the wipers 264, 265 and 266 until, following the receipt of nine pulses from the tens minutes register 270, the grounded wiper 264 is moved into engagement with the tenth contact in the bank 261, which contact represents an elapsed period of time equal to nine hours. At this time, ground is applied from the wiper 264 through the "9" manifesting contact in the bank 261, through a pair of normally closed contacts 206 and the closed contacts 269 to energize the lower operating winding of the steering relay 210. The steering relay 210, in opening, closes a pair of contacts 212 and opens the contacts 211.

The opening of the contacts 211 prevents the motor magnet 268 from being energized in response to the receipt of the next pulse from the tens minutes register 270. The closure of the contacts 212 applies the next pulse received from the tens minutes register 270, representing an elapsed time of ten hours, to the operating winding of the reset magnet 267 so that this magnet is operated to return the wipers 264, 265 and 266 to their normal home position under spring action. The application of ground to the contacts 212 also energizes the upper operating winding of the steering relay 210 so that this relay is not released when the wiper 264 is returned to its normal home position, thereby removing ground from the lower operating winding of the steering relay 210.

The contacts forming the contact bank 263 are designated "0" and "1" to "9," inclusive, when considered from right to left in FIG. 2, and the selective position of the wiper 266 in engagement with one of these contacts manifests the magnitude of the digit in the units hours column of the time notation. A single contact in the bank 262 is connected to the wiper 285 in the units minutes register 280 to provide a portion of the circuit for initiating a cycle of normal operation of the playback control circuit.

The closure of the contacts 212 also applies the tenth pulse received from the tens minutes register 270, indicating that ten hours have elapsed, to the operating winding of a motor magnet 258 in the tens hours register 250 through a pair of normally closed contacts 203. In addition to the motor magnet 258, the tens hours register 250 includes a steering relay 200, a reset magnet 257, and a plurality of wipers 254, 255 and 256 which are sequentially advanced by the motor magnet 258 to engage contacts forming a plurality of contact banks 251, 252 and 253, respectively. The operation and release of the motor magnet 258 opens and closes a pair of contacts 259 and advances the wipers 254, 255 and 256 out of engagement with the "0" representing home contact and into engagement with the second contact in the banks 251, 252 and 253 which is representative of the digit "1" in the tens hours denominational column.

The next ten pulses received from the tens minutes register 270, indicating the elapse of an additional ten hours, or a total elapsed time of twenty hours, operates the units hours register 260 in the manner described in detail above, so that the wipers 264, 265 and 266 are returned to their normal home contacts representing "0" units hours. The application of the second pulse to the tens hours register 250 through the closed contacts 212 operates the motor magnet 258 so that the wipers 254, 255 and 256 are moved into engagement with the third contacts in the contact banks 251, 252 and 253, respectively. These contacts represent an elapsed time of two tens hours or twenty hours. The movement of the wiper 254 into engagement with the "2" representing contact in the bank 251 applies ground through the closed contacts 259 to energize the lower operating winding of the steering relay 200 thereby operating this relay to open the contacts 201, 203 and 206, and to close the contacts 202, 204 and 205.

The opening of the contacts 201 performs no useful function at this time. The opening of the contacts 206, together with the return of the wiper 264 to its normal home position, interrupts the operating circuit for the lower winding of the steering relay 210. The opening of the contacts 203 prevents the next pulse transferred from the units hours register 260 from operating the motor magnet 258. The closure of the contacts 204 conditions the reset magnet 257 and the upper winding of the relay 200 for operation in response to receipt of the next pulse from the units hours register 260. The closing of the contacts 205 prepares a circuit for operating the lower operating winding of the steering relay 210 in the units hours register 260 in response to the grounding of the fourth contact in the contact bank 261 representing three units hours. The closure of the contacts 202 prepares a path for energizing the units days register circuit 180 in response to the receipt of pulses from the time source 240 indicating a total elapsed time of twenty-four hours.

In response to the receipt and termination of the third pulse transmitted thereafter from the tens minutes register 270, indicating a total elapsed time of twenty-three hours, the motor magnet 268 is operated and released to advance the wipers 264, 265 and 266 into engagement with the fourth contact in the contact banks 261, 262 and 263, thus indicating that the magnitude of the digit represented in the units hours register 260 is "3" and thereby indicating that twenty-three hours have elapsed. The movement of the wiper 264 into engagement with the "3" manifesting contact in the bank 261 applies ground through the closed contacts 205 and 269 to energize the lower operating winding of the steering relay 210 so that this relay operates to close the contacts 212 and to open the contacts 211. The opening of the contacts 211 disables the operating circuit for the motor magnet 268 in the units hours register 260, and the closure of the contacts 212 prepares the operating circuit for the reset relay 267 in the units hours register 260 and for the reset magnet 257 in the tens hours register 250.

The next ground pulse produced by the time source 240, transmitted through the closed contacts 232, 222 and 212, i.e., the next ground pulse transmitted from the tens minutes register 270, energizes and operates the reset magnet 267, whereby the wipers 264, 265 and 266 are returned to their normal home position in engagement with contacts representing "0" units hours. This ground pulse, representing the elapsed period of twenty-four hours is also applied through the closed contacts 204 to operate the reset magnet 257 to return the wipers 254, 255 and 256 to their normal home position in engagement with contacts representing "0" tens hours. In addition to operating the reset magnets 257 and 267, the twenty-fourth pulse applied to the units hours register 260 energizes the upper operating winding of the steering relays 200 and 210 so that these relays remain operated when the wipers 254 and 264 are returned to their normal home positions as described hereinabove.

The contacts provided in the contact bank 253 are designated "0," "1" and "2" when viewed from right to left in FIG. 2, and the position of the wiper 256 with respect thereto determines the magnitude of the digit manifested in the tens hours column of the time notation. The wiper 255 is grounded and selectively engages the "0" manifesting contact in the bank 252 to apply ground to the wiper 265 to form a portion of the circuit for energizing the playback control circuit as described hereinafter.

Accordingly, the return of the wiper 254 to its normal home position removes ground from the lower operating winding of the tens hours steering relay 200 so that this relay is released when the ground pulse is terminated by the time source 240. The return of the wiper 264 to its normal home position deenergizes the lower operating winding of the steering relay 210, so that this relay releases when the ground pulse is terminated by the timing source 240. The release of the steering relays 220 and 230, which is also produced in response to the termination of the ground pulse representing an elapsed time of twenty-four hours, conditions the units minutes register 280, the tens minutes register 270, the units hours register 260 and the tens hours register 250 for another cycle of operation to indicate an elapsed time of twenty-four hours. Therefore, at the end of a twenty-four hour period, the plurality of wipers 254, 255, 256, 264, 265, 266, 274, 276, 284, 285 and 286 are all returned to their normal home position, wherein these wipers engage contacts representing "0" in their respective denominational orders of the time notation at which a particular call is terminated. Also, in this normal position following the receipt of pulses representing an elapsed time of twenty-four hours, all of the steering relays are released together with their respectively associated motor magnets 258, 268, 278, 288 and reset magnets 257, 267, 277 and 287.

The operation of the steering relay 200 in the tens hours register circuit 250 in response to the receipt of pulses indicating an elapsed time of twenty-three hours also conditions the units days register circuit 180 for operation. More particularly, when the steering relay 200 is operated, the contacts 202 are closed so that the ground pulse from the time source 240 which operates the reset magnets in the tens hours, units hours, tens minutes, and units minutes register circuits is also applied through a pair of normally closed contacts 152 to energize the operating winding of a motor magnet 188. In addition to the motor magnet 188, the units days register circuit 180 includes a steering relay 150, a reset magnet 187, and a pair of wipers 184 and 186 which sequentially engage the plurality of contacts forming a pair of contact banks 181 and 183, respectively. The contact banks 181 and 183 each include ten contacts representing, when viewed from right to left in FIG. 1 of the drawings, "0" and the digits "1" to "9," inclusive.

The application of ground to the operating winding of the motor magnet 188 through the contacts 152, indicating an elapsed time of twenty-four hours, operates this magnet to open a pair of contacts 189 and to condition the wipers 184 and 186 for movement into engagement with the second contact in the contact banks 181 and 183. When ground is removed from the operating winding of the motor magnet 188 in response to the termination of the ground pulse by the time source 240, this magnet releases to reclose the contacts 189 and to advance the wipers 184 and 186 into engagement with the "1" manifesting contacts in the contact banks 181 and 183, respectively.

Thereafter, the units days register circuit 180 is operated, as described hereinabove, in response to the receipt of a ground pulse through the tens hours register 250 indicating that twenty-four hours or a single day has elapsed. In response to each of these pulses, the wipers 184 and 186 are advanced to engage the next successive contacts in the contact banks associated therewith. This operation continues until such time as the wipers 184 and 186 are moved into engagement with the last or tenth contacts in the banks 181 and 183, which contacts represent the digit "9." In response to moving the wiper 184 into engagement with the "9" designated contact in the bank 181, ground is applied through a pair of normally closed contacts 146 and the contacts 189 to energize the lower operating winding of the steering relay 150 so that this relay operates to open the contacts 152 and a pair of contacts 151, and to close a pair of contacts 153.

The opening of the contacts 151 produces no useful function at this time. The opening of the contacts 152 disables the operating circuit for the motor magnet 188 in the units days register circuit 180. The closure of the contacts 153 conditions the reset magnet 187 for operation in response to the next pulse applied to the units days register circuit 180. When the next ground pulse is applied from the time source 240 through the tens hours register circuit 250, thus indicating an elapsed time of ten days, ground is applied to the operating winding of the reset magnet 187 to operate this magnet. The operation of the magnet 187 returns the wipers 184 and 186 to their normal home position in engagement with the contacts in the banks 181 and 183 representative of "0" units days. Simultaneously, the application of ground through the contacts 153 energizes the upper operating winding of the steering relay 150 so that this relay remains operated following the return of the wipers 184 and 186 to their normal home positions.

The ground applied through the closed contacts 153 is also transmitted to the operating winding of a motor magnet 178 in the tens days register circuit 170 through a pair of normally closed contacts 143. In addition to the motor magnet 178, the tens days register circuit 170 includes a steering relay 140, a reset magnet 177, and a pair of wipers 174 and 176 which are sequentially moved over the contacts forming a pair of contact banks 171 and 173, respectively. The contacts forming the bank 173 are designated as "0" and "1" to "3," inclusive, when viewed from right to left in FIG. 1 and, together with the wiper 176, provide a means for interconnecting the clock and calendar circuit 27 with the scanning circuit 29 so that the information manifested by the selective position of the wiper 176 may be transmitted through the scanning circuit 29 to produce a group of mark pulses in the trunk recorder in accordance with the position of the wiper 176.

The application of ground through the normally closed contacts 143 to the operating winding of the motor magnet 178 operates this magnet to open a pair of contacts 179 and to condition the wipers 174 and 176 for advancing in response to the termination of ground. When ground is removed from the operating winding of the motor magnet 178, the contacts 179 are reclosed and the wipers 174 and 176 are moved under resilient action into engagement with the second contacts in the banks 171 and 173, which contacts are representative of "1" tens days, or ten days. Accordingly, the tens days register circuit 170 is selectively operated under the control of the completion of one cycle of operation of the units days register circuit 180, thereby providing an indication in the tens days register circuit 170 in response to an elapsed time equal to ten days.

The above-described cycle of operation in the units days register circuit 180 is completed once again in response to the receipt of ten pulses received from the time source 240 through the tens hours register circuit 250, thereby indicating that an additional ten days have elapsed. In response to the receipt of these ten pulses, the units days register circuit 180 permits a second pulse to be transmitted to the operating winding of the motor magnet 178, thereby to operate this magnet. In response to the termination of this ground pulse, the motor magnet 178 releases to close the contacts 179 and to move the wipers 174 and 176 into engagement with the third contacts in the banks 171 and 173 which are designated by the digit "2." Simultaneously with the movement of the wipers 174 and 176 into engagement with the "2" designated contacts in the banks 171 and 173, the reset magnet 187 in the units days register circuit 180 is operated and released to return the wipers 184 and 186 into engagement with the first contacts in the contact banks 181 and 183, thereby representing "0" units days. The return of the wipers 184 and 186 to their normal home positions, together with the termination of the ground pulse provided by the time source 240, releases the steering relay 150 in the units days register circuit 180 so that the contacts 153 are reclosed to permit the motor magnet 188 in the units days register circuit 180 to be energized in response to the next pulse transmitted thereto through the tens hours register circuit 250.

Accordingly, when the time source 240 has transmitted a number of ground pulses separated from each other by time intervals of one minute, which are equal in number to an elapsed time of twenty days, the wiper 174 is in engagement with the "2" designated contact in the contact bank 171, the wipers 184 and 186 in the units days register circuit 180 are in engagement with the "0" representing contacts in the banks 181 and 183, the wipers 254, 255 and 256 in the tens hours register circuit 250 are in engagement with the "0" representing contacts in the contact banks 251 and 253, the wipers 264, 265 and 266 are in engagement with the "0" designating contacts in the contact banks 261, 262 and 263, the wipers 274 and 276 are in engagement with the "0" representing contacts in the contact banks 271 and 273, and the wipers 284, 285 and 286 are in engagement with the "0" representing contacts in the banks 281, 282 and 283 in the units minutes register circuit 280.

Referring now to the months register circuit 160, this circuit includes a rotary stepping switch actuated by a motor magnet 161a and having a plurality of wipers 167, 168, 169 and 166 which are adapted to selectively engage contacts forming a plurality of contact banks 162, 163, 164 and 165, respectively. The contact banks 162, 163, 164 and 165 each include fifty-two separate contact points which, as disclosed in FIG. 5 of the drawings, are divided into four groups of twelve contacts each (as illustrated), with the remaining four contacts (not shown) not being utilized. For convenience, in FIG. 1 of the drawings, the contact banks have been considerably simplified and merely disclose the functional operation performed by each of these contact banks, although the exact wiring to the contact banks is shown in FIG. 5 of the drawings.

As shown in FIG. 5 of the drawings, the first forty-eight contacts in the banks 163, 164 and 165 are divided into four groups of twelve each. Each of these groups of twelve contacts represents the twelve months of the year, and one of the contact groups of twelve contacts is representative of a leap year. All of the contacts representing a particular month of the year, except February of leap year, are strapped together, and further, in bank 163, all of the months of the year having a number of days therein designated by the same digit in the units denominational column are strapped together. For instance, all of the contacts representing the month of January, in the four groups of twelve contacts in the contact bank 163 are strapped together, and further, these contacts are connected to like joined contacts representative of the months of March, May, July, August, October and December since all of these months are alike in including thirty-one days. Accordingly, all of the months having "1" as the last digit in the notation thereof, are joined together and connected to a common conductor. In FIG. 1 of the drawings, the plurality of contacts connected to the conductor designating a month having a notation with a "1" in the units denominational column are represented by the single contact 163a in the contact bank 163. The contact 163a is connected to the "1" representing contact in the contact bank 181 in the units days register circuit 180.

Also, all of the contacts in the contact bank 163 (FIG. 5) representing months such as April, June, September and November, which include thirty days are joined together and connected to a common conductor. These commonly connected contacts are represented as contact 163b in FIG. 1 of the drawings, and this contact is directly connected to the "0" designated contact in the contact bank 181 in the units days register circuit 180.

The three contacts in the contact bank 163 representing the month of February in a normal year are connected to a common connector and, as shown in FIG. 1 of the drawings, the twenty-eight day months of February are represented by the contact 163c which is connected to an "8" manifesting contact in the contact bank 181 of the units days register circuit 180. The single group of twelve contacts representing a leap year contains a contact representing a twenty-nine day month. This single contact is designated as 163d in FIGS. 1 and 5 of the drawings and is connected to the "9" manifesting contact in the contact bank 181 in the units days register circuit 180.

In the contact bank 164 (FIG. 5), the months of February, which include a number of days represented by the digit "2" in the tens denominational column, are represented by the contacts 164a. These contacts are connected to the "2" manifesting contact in the contact bank 171 of the tens days register circuit 170.

The contacts in the bank 164, other than those representing the month of February, are representative of months including the digit "3" in the tens days denominational column. These contacts are connected together and, as shown in FIG. 1 of the drawings, are designated as 164b and are connected to the "3" manifesting contact in the contact bank 171 in the tens days register circuit 170. Accordingly, all of the contacts in the contact bank 164 which represent months other than February and comprise thirty or thirty-one days in duration are connected to a single common conductor which is connected to the contact bank 171 of the tens days register circuit 170.

In the contact bank 165 (FIG. 5), all of the contacts representing like months are connected together and to a single output conductor which extends to the scanning circuit 29 so that the information selectively manifested by the position of the wiper 166 is capable of being transmitted to the scanning circuit 29 to permit this information to be recorded in the associated trunk recorder. As shown in FIG. 5 of the drawings, the month of January is represented by the numerical character "1" and the month of December is represented by the numerical notation "12."

Assuming that the months register circuit 160 is set in a position to indicate that the current month is February of a normal year, the wiper 168 is in engagement with one of the contacts indicated by the reference numeral 163c, and the wiper 169 is in engagement with one of the contacts designated by the reference numeral 164a. As described hereinabove, the receipt of two pulses from the time source 240 through the closed contacts 153 in the units days register circuit 180 sequentially operates and releases the motor magnet 178 in the tens days register circuit 170 so that the grounded wiper 174 is moved into engagement with the "2" designated contact in the bank 171. The movement of the wiper 174 into engagement with this contact indicates that a number of pulses have been received from the time source 240 which represents the expiration of twenty days' time.

The movement of the wiper 174 into engagement with the contact designated by the character "2" applies ground through this contact and through the contact 164a the wiper 169, and the normally closed contacts 179 to energize the lower operating winding of the steering relay 140. The energization of this winding operates the steering relay 140 to open contacts 141, 143 and 146 and to close the contacts 142, 144 and 145. The opening of the contacts 141 disables the self-energizing circuit for a motor magnet 161a in the months register circuit 160, but performs no useful function at this time. The opening of the contacts 143 disables the operating circuit for the motor magnet 178 in the tens days register circuit 170, thereby indicating that the current month includes a number of days less than thirty since the movement of the wiper 174 into engagement with the "2" designating contact in the contact bank 171 operates the steering relay 140 to disable the tens days register circuit 170 from receiving additional pulses from the units days register circuit 180.

The opening of the contacts 146 disables the operating circuit for the lower winding of the steering relay 150 in the units days register circuit 180 so that this steering relay can only be operated under the control of the units days wiper 168 in the months register circuit 160. The disabling of the normal operating circuit for the steering relay 150 and, accordingly, for the reset magnet 187 in the units days register circuit 180 transfers the control over this reset magnet to the months register circuit 160 so that the units days register circuit 180 can be reset to a "0" manifesting position only following the receipt of the number of pulses representative of the number of days comprising the current month, as indicated by the selective position of the wipers in the stepping switch forming the months register circuit 160.

The closure of the contacts 145 to interconnect the wiper 168 with the contact bank 181 of the units days register circuit 180 prepares a circuit for initiating the resetting the units days register circuit 180 in response to the receipt of the number of pulses representing the number of days comprising the current month. The closure of the contacts 142 conditions the month stepping magnet 161a for operation following the receipt of a ground pulse representing the end of the last day of the month, that is, the twenty-eight days forming the current month of February in a normal year. The closure of the contacts 144 conditions a circuit for operating the upper winding of the steering relay 140 and the reset magnet 177 in the tens days register circuit 170, so that this circuit is reset to a "0" manifesting position following the receipt of the twenty-eighth pulse from the tens hours register circuit 150, thereby indicating completion of the current month.

Thereafter, the receipt of eight pulses from the timing source 240 through the tens hours register circuit 250 sequentially advances the wipers 184 and 186 so that the wiper 184 is moved into engagement with the contact designated by the character "8" in the contact bank 181. The movement of the grounded wiper 184 into engagement with this contact completes the operating circuit previously traced through the wiper 168 and the closed contacts 145 and 189 to operate the steering relay 150 by energizing the lower operating winding thereof. The operation of the steering relay 150 opens the contacts 151 and 152 and closes the contacts 153. The opening of the contacts 151 produces no useful function at this time.

The opening of the contacts 152 disables the energizing circuit for the motor magnet 188 in the units days register circuit 180. The closure of the contacts 153 prepares the operating circuits for the reset magnets 177 and 187, the stepping magnet 161a in the months register circuit 160, and a stop relay 130. Accordingly, the receipt of a pulse from the tens hours register circuit 250, indicating the completion of an elapsed period of time equal to that manifested by the setting of the months register circuit 160, completes the preparation of the units days register circuit 180 and the tens days register circuit 170 for being reset to a "0" manifesting position. The receipt of this pulse also completes the conditioning of the circuit for operating the stepping relay 161a in the months register circuit 160 to advance the wipers therein to the next contact in the contact banks associated therewith, thereby to represent that the date has changed to the next succeeding month, i.e., in the assumed example from the month of February to the month of March. This pulse also completes the conditioning of the stop relay 130.

The next pulse applied from the tens hours register circuit 250 indicates that an additional day's time has elapsed, i.e., the twenty-eighth day of February has been completed. This pulse is applied through the closed contacts 202, 153 and 144 to simultaneously operate the reset magnets 177 and 187, and to lock up the steering relays 140 and 150 in the tens days register circuit 170 and the units days register circuit 180, respectively. The operation of the reset relay 177 returns the wipers 174 and 176 to a normal home position in engagement with the contacts representing "0." The operation of the reset magnet 187 returns the wipers 184 and 186 to their normal home position in engagement with the contact representing "0" in the contact banks 181 and 183.

This pulse from the tens hours register circuit 250 is also applied through the closed contacts 142 to operate the stepping magnet 161a. In response to the termination of this pulse, the stepping magnet 161a advances the wipers 167, 168, 169 and 166 into engagement with the next contact in the contact banks associated therewith. In accordance with the previous assumption that these wipers are positioned in engagement with contacts representing the month of February in a normal year, the sequential operation and release of the stepping magnet 161a advances these wipers into engagement with the contacts representing the month of March. In this position, the wiper 168 is in engagement with the contact 163a which is connected to the "1" manifesting contact in the contact bank 181, and the wiper 169 is in engagement with a contact represented by the reference numeral 164b which is connected to a "3" manifesting contact in the contact bank 171.

It should be noted that the receipt of a number of pulses, equal in magnitude to the number of days forming the current month, does not reset the tens days and units days registers 170 and 180 and operate the months register circuit 160, but merely conditions these circuits for operation. These circuits are operated in response to the receipt of a pulse from the tens hours register circuit 250 indicating that an additional day has been completed, thereby moving the date into the next succeeding month. This is necessary inasmuch as the wipers 176 and 186 must remain in engagement with the contacts in the contact banks 173 and 183 which represent the correct day of the month until such time as this day has been terminated. If these register circuits were reset following the receipt of the pulse indicating that the twenty-eighth day of the month of February had been reached, the date selectively manifested by the date and time register circuit 28 during the twenty-eighth day of the month of February would produce an indication representing the zero day of March. Therefore, as described above, the tens days register circuit 170 and the units days register circuit 180 are reset in response to the receipt of a pulse through the tens hours register circuit 250 which indicates the completion of the twenty-eighth day.

This pulse also operates the stepping magnet 161a and the months register circuit 160 so that the indication of the month provided by this register circuit is not changed to indicate the month of March until such time as the last day of February is completed. However, the use of this pulse representing the termination of the twenty-eighth day of the month of February for resetting the register circuits and for advancing the month register 160 absorbs this pulse so that it cannot be used for energizing the operating winding of the motor magnet 188 in the units days register circuit 180 to produce the correct indication therein of the first day of the next succeeding month.

More particularly, the twenty-ninth pulse, assuming the month to be February of a normal year, resets the wiper 184 to a position in which this wiper engages the "0"-manifesting contact in the contact bank 181 so that, following the movement of the wipers in the months register circuit 160, when considered in conjunction with the tens and units day register circuits, the date and time register circuit 28 represents the month of March, and the zero day in the month of March. The correct indication in the date and time register circuit 28 at this time should be the first day of March wherein the wiper 186 would be in engagement with the second contact in the contact bank 183 which represents the digit "1."

To provide a means for correcting the manifestation in the units days register 180, the pulse applied through the closed contacts 144 for resetting the tens days register circuit 170 is also applied to the slow-to-release stop relay 130 so that this relay is operated to open a pair of contacts 131 and to close a pair of contacts 132. The closure of the contacts 132 applies ground to the contacts 151. When the units days steering relay 150 and the tens hours steering relay 200 are released, upon the termination of the twenty-ninth ground pulse, the contacts 201, 151 and 152 are closed. The closing of these contacts completes a path from the grounded contacts 132 to the operating winding of the motor magnet 188, thereby to operate this relay to prepare the wipers 184 and 186 for movement into engagement with the second contacts in the contact banks 181 and 183 representing "1." Ground is applied through this circuit following the release of the steering relays 150 and 200 even though the ground pulse is simultaneously removed from the stop relay 130 inasmuch as this relay is slow-to-release. The slow-to-release characteristic of this relay maintains the contacts 133 closed until such time as the steering relays 150 and 200 are released to complete the path for operating the motor magnet 188 in the units days register circuit 180.

The operation of the stop relay 130 to open the contacts 131 interrupts the energizing circuit for the scanning circuit 29. The opening of the start conductor for the scanning circuit 29 prevents the seizure of the scanning circuit 29 to initiate an operation wherein the information manifested in the time and date register circuit 28 is transmitted to the trunk recorder 25. It is necessary to prevent the scanning circuit 29 from initiating an operation at this time inasmuch as it is desired to reset the months register 160, the tens days register circuit 170 and the units days register circuit 180 before the initiation of this transmitting cycle so that no false indications are produced in the associated recorder 25 in the event that the resetting operations are not completed at the time the scanning operations is initiated. Following this predetermined time interval, the stop relay 130 is released to close the contacts 131 and to open the contacts 132. The opening of the contacts 132 interrupts the operating circuit for the winding of the motor magnet 188 so that the wipers 184 and 186 are advanced to a position in engagement with the second contact in the contact banks 181 and 183. The closure of the contacts 131 reestablishes the start circuit for the scanning circuit 29, so that this circuit may be seized by a trunk recorder to initiate an operation wherein information represented by the selective positions of the wipers in the date and time register circuit 28 is transmitted to the seized recorder in the form of a plurality of groups of mark pulses.

The date and time register circuit 28 operates in the manner described hereinabove during the month of March until such time as, following the receipt of the thirtieth pulse from the time source 240 through the tens hours register circuit 250, the wiper 174 in the tens days register circuit 170 is moved into engagement with the fourth contact in the contact bank 171, which contact manifests the digit "3." The movement of the wiper 174 into engagement with this contact completes a circuit for operating the steering relay 140 extending through the grounded wiper 174, the contact 164b, the wiper 168, and the contacts 179.

The operation of the steering relay 140 performs the same function as described hereinabove, at the completion of the month of February. This thirtieth pulse also resets the units days register circuit 180 so that the wiper 184 is positioned in engagement with the "0" contact in the contact bank 181. Since the month of March includes thirty-one days, a circuit is not completed through the wiper 168 at this time. However, in response to the thirty-first pulse transmitted through the tens hours register circuit 250, the wiper 184 is moved into engagement with the second contact in the bank 181 representing the digit "1." This movement completes a circuit for operating the steering relay 150 in the units days register circuit 180 to condition this circuit for being reset in response to the next pulse received from the tens hours register circuit 250. The thirty-second pulse received from the tens hours register circuit 250 operates the stepping magnet 161a in the months register circuit 160, and also operates the reset magnets 177 and 187 to restore the wipers 174, 184, 176 and 186 to their normal positions in engagement with the first contacts in the contact banks associated therewith. The date and time register circuit 28 then completes a cycle of operation as described above in conjunction with the termination of the month of February including twenty-eight days and, incident to this cycle of operation, advances the wipers 167, 168, 169 and 166 into engagement with contacts representing the month of April. Following this cycle of operation ground is again applied from the closed contacts 132 to the operating winding of the motor magnet 188 in the units days register circuit 180 so that the wipers 184 and 186 are advanced into engagement with the second contact in the contact banks associated therewith, which contacts are representative of the digit "1," thereby completing the cycle of operation whereby the date and time register circuit 28 changes from the manifestation of the thirty-first day of March to the first day of April.

In the contact bank 162, the last four of the fifty-two contacts thereon are connected together and also connected to the operating winding of the stepping magnet 161a through a pair of interrupter contacts 161b and the normally closed contacts 141. Since only forty-eight of the fifty-two contacts provided on the stepping switch are utilized to represent the months forming four separate years, the last four contacts on the contact banks are not used. In order to return the wipers 167, 168, 169 and 166 into engagement with the first contact in these banks following the passage of a time period of four years, ground is applied through the wiper 167 to the forty-ninth contact and therethrough to the interrupter contacts 161b and the contacts 141 to operate the stepping magnet 161a. The operation of this relay opens the contacts 161b to interrupt the operating circuit for the stepping magnet 161a, and thereby permits the wipers to advance a single contact. Thereafter, the ground applied to the next three contacts, i.e., contacts 50, 51 and 52 sequentially operates the stepping magnet 161 to return the plurality of wipers into engagement with the first contacts in the contact banks 162, 163, 164 and 165.

The operation of the date and time register circuit 28 continues in the manner described above, so that at any particular given time, the position of the wipers 166, 176, 186, 256, 266, 276 and 286 represent the month, tens days, units days, units hours, tens hours, tens minutes and units minutes notation of the date and time. In general, the date and time register circuit 28 operates to provide this continuous indication of time in the tens and units minutes register circuits 270 and 280 by serially operating a pair of stepping switches in response to the completion of one minute and ten minutes, respectively. In the tens hours and units hours circuits 250 and 260, the reset magnets are conditioned for being reset to a normal position in response to the twenty-fourth pulse transmitted thereto, thus representing the completion of twenty-four hours or one day.

The tens days register circuit 170 and units days register circuit 180 are provided with contact banks selectively interconnected through the months register circuit 160. This selective interconnection provides the tens days and units days resetting magnets 177 and 187 with information pertaining to the time at which their respectively controlled wipers should be restored to the normal position, so that these register circuits may be reset following a time duration equal to the number of days comprising the current month. More particularly, the tens and units days register circuits 170 and 180 are conditioned for resetting in response to the receipt of pulses from the tens hours register circuit 250 indicating that the last day of the month has been completed. The pulse produced by the time source 240 and coupled to these circuits through the tens hours register circuit 250 representing the initiation of the first day of the next month operates these register circuits to reset them to a normal position. Incident to this resetting operation, the stop relay 130 disables the scanning circuit 29 also feeds a single pulse to the operating winding of the motor magnet 188 in the units days register circuit 180 so that this circuit is operated to provide a manifestation of the first day of the month. Although only a description of the operation of the date and time register circuit 28 following the termination of the months February and March has been described in detail above, it is to be understood that the date and time register circuit 28 is reset under the control of the contacts 163b, 163d, 164a and 164b at the termination of the months comprising twenty-nine or thirty days in the manner described above in conjunction with the operation of this circuit during the months comprising twenty-eight and thirty-one days.

Also, the wipers 255, 265 and 285 and a single contact in the banks 252, 262 and 282, respectively, form a single continuous circuit for applying ground to a start conductor 260 for initiating a normal cycle of operation of the playback control circuit as described in the above-identified Morris application. As shown, the clock and calendar circuit applies ground to the conductor 260 for a one minute interval at 2:00 A.M. Obviously, the above-listed wipers and contact banks could be wired to ground the conductor 260 at a plurality of selected times or at a time other than that shown.

The scanning circuit 29 (FIGS. 3 and 4) comprising a part of the clock and calendar circuit 27 is common to all of the trunk circuits associated with a particular calling exchange and is interposed between an associated trunk recorder and the date and time register circuit 28 so that, in response to the initiation of a cycle of operation thereof, the scanning circuit 29 provides this trunk recorder with a plurality of groups of mark pulses representing the items of information pertaining to the date and time for terminating a toll call. More particularly, the scanning circuit 29 includes a relay counting chain 400, which is connected to the information registering contact banks in the date and time register circuit 28.

A steering circuit 401 in the scanning circuit 29 selectively energizes a single wiper in the date and time register circuit 28 so that the counting chain 400 is interconnected with only one of the wipers in the date and time register circuit 28. In response to this selective operation of one of the wipers in the date and time register circuit 28, the counting chain 400 produces a group of mark pulses proportional to the numerical designation of the contact on which the grounded wiper is positioned. Thereafter, the steering circuit 401 successively grounds the other wipers in the date and time register circuit 28 so that the counting chain 400 produces a plurality of groups of mark pulses, the number of pulses in each group of which is proportional to the designation of the contact with which the grounded wiper is in engagement. Following the transmission of these items of information to the seized recorder 25, the operation of the scanning circuit 29 is terminated.

More particularly, as described hereinabove, the scanning circuit 29 is energized to initiate a cycle of operation in response to the application of ground to the start conductor 361 by the one-way trunk circuit in response to the receipt of a signal from either the called or calling subscriber indicating that the call has been terminated. This ground is applied through the contacts 131 in the date and time register circuit 28 and the normally closed contacts 302 to the operating winding of a start relay 310. The application of ground to the operating winding of the start relay 310 operates this relay to close a plurality of contacts 311, 312, 314, 315, and 316, and to open a pair of contacts 313. The closure of the contacts 311 applies ground to the operating winding of a steering relay 485 in the steering circuit 301. The closure of the contacts 312 applies ground to the steering relay circuit 401 for a purpose which will be described more fully hereinafter. The closure of the contacts 314 applies ground through a plurality of closed contacts 321 and 303 to the conductor 362. The application of ground to the conductor 362 operates the slow-to-release clock relay in the one-way trunk circuit so that this relay completes the paths for interconnecting the conductors 363, 365 and 366 with the common pulse relay, the mark head 32 and the space head 34, respectively, in the seized trunk recorder 25, as described in detail in the above-identified Morris patent. The closure of the contacts 315 applies ground to a plurality of open contacts 323 and 324 and to the operating winding of a start assist relay 350 through a plurality of normally closed contacts 331 and 342. The closure of the contacts 316 applies ground through a normally closed pair of contacts 344 to an open pair of contacts 359.

The application of ground to the operating winding of the start assist relay 350, which is slow-to-operate, operates this relay after a predetermined period of time to open a plurality of contacts 351, 352 and 357 and to close contacts 353, 354, 356, 358 and 359. The opening of the contacts 351 and 352 produces no useful function at this time. The closure of the contacts 353 conditions a locking circuit for the start assist relay 350 extending from the now open contacts 324. The closure of the contacts 354 applies ground to the counting chain 400. The closure of the contacts 356 interconnects the now open contacts 325 with a pair of contacts 475. The opening of the contacts 357 interrupts the circuit between the operating winding of a relay 330 and the now open contacts 325. The closure of the contacts 358 applies ground to the upper operating winding of a steering relay 480 in the counting chain 400. The closure of the contacts 359, when the start assist relay 350 operates, completes a path for initiating operation of a pulse generator 496 which extends from contacts 316 through the normally closed contacts 344. The application of ground to the start conductor of this generator initiates operation of the generator 496 so as to begin the production of a plurality of ground pulses which are applied to the operating winding of a pulse forming relay 490.

The opening of the contacts 313 in response to the operation of the start relay 310 breaks the energizing circuit for the normally operated and slow-to-release relay 320 so that this relay releases to open the contacts 321 and to close a plurality of contacts 322, 323, 324 and 325. The opening of the contacts 321 removes the ground previously applied to the slow-to-release clock relay which, as described in the above-identified Morris application, does not release because of a locking circuit provided in the trunk circuit. The closure of the contacts 322 applies ground from the contacts 314 through the normally closed contacts 302 to complete a locking circuit for the start relay 310 so that this relay remains operated when ground is removed from the start conductor 161.

The closure of the contacts 323 produces no useful function, inasmuch as the contacts 351 are opened by the prior operation of the start assist relay 350. The closure of the contacts 324 completes a locking circuit from ground through the closed contacts 315 to maintain the start assist relay 350 operated. This circuit extends from the grounded and closed contacts 315 through the contacts 324, 353 and 342 to the operating winding of the start assist relay 350. The closure of the contacts 325 applies ground to the operating winding of a relay 340 which is not operated inasmuch as the winding of this relay is not connected to battery. The closure of the contacts 325 also applies ground through the closed contacts 356 to the open contacts 475.

The operation of the start assist relay 350, as described hereinbefore, completes the circuit for initiating operation of the pulse generator 496. The first ground pulse produced by the generator 496 is applied to the operating winding of the pulse relay 490 to operate this relay thereby to open a plurality of contacts 491, 492 and 494 and to close a plurality of contacts 495 and 493. The opening of the contacts 491 and 492 produces no useful function at this time. The opening of the contacts 494 disconnects ground from a pair of open contacts 473 which are connected to the advance pulse conductor 363.

The closure of the contacts 493 applies ground through a pair of normally closed contacts 444 to the mark pulse conductor 365. As described in detail hereinabove, the application of ground to the mark pulse conductor 365 energizes the mark head 32 in the seized recorder 25 so that a single mark pulse is produced in the magnetic tape 30 therein. The closure of the contacts 495 applies ground to a pair of normally open contacts 446 and produces no useful function at this time. However, the closure of the contacts 495 also applies ground through a pair of normally closed contacts 474 to the operating winding of a pulse assist relay 470 to operate this relay.

The operation of the pulse assist relay 470 closes a plurality of contacts 471, 472, 473 and 475 and opens the contacts 474. The contacts 474 and 475 are arranged in a make-before-break construction so that the contacts 475 are closed to complete a locking circuit for the pulse assist relay 470, which extends from closed and grounded contacts 325, before the operating ground is removed from the operating winding of the pulse assist relay 470, due to the opening of the contacts 474. Accordingly, the pulse assist relay 470 remains operated at this time. The closure of the contacts 473 connected to the advance pulse conductor 363 produces no useful function at this time inasmuch as the contacts 494 are open due to the operation of the pulse relay 490.

The closure of the contacts 471 and 472 applies ground to the now open contacts 491 and 492 to prepare a circuit for operating the counting chain 400. Accordingly, the operation of the pulse relay 490 and the pulse assist relay 470 applies a single mark pulse to the mark pulse conductor 365. Also, the sequential operation of these two relays conditions the counting chain 400 for operation in response to the termination of the ground pulse applied to the operating winding of the pulse relay 490 from the generator 496.

The counting chain 400, in addition to the steering relay 480, includes a plurality of counting relays 450, 435, 425, 415, 405, 390, 385, 380, 375, 370, 365, and 360, the sequential operation of which is capable of selectively producing any number of pulses between one and twelve. The counting chain 400 is connected to the output contact banks 165, 173, 183, 253, 263, 273 and 283 in the date and time register circuit 28, and operates to selectively control the production of groups of mark pulses proportional in number to the numerical designation of the selectively engaged contact in the associated contact bank in the date and time register circuit 28. The counting chain 400 is sequentially rendered effective to produce a group of mark pulses in accordance with the position of each of the sequentially grounded wipers in the date and time register circuit 28. The order in which the pulses are produced under the control of the counting chain 400 is controlled by the steering circuit 401.

More particularly, in the normal condition of the steering circuit 401, ground is applied through the uppermost contacts controlled by the plurality of relays in the steering circuit 401 from a first pair of normally closed contacts 396 to the wiper 256 in the tens hours register circuit 250. This ground is applied from the wiper 256 through the contact with which this wiper is in engagement and to an uppermost contact controlled by one of the plurality of relays forming the counting chain 400.

Since the wiper 256 is normally connected to ground through the steering chain 401, the first group of mark pulses produced under the control of the counting chain 400 is representative of the tens digit of the notation of the hour at which the toll call is terminated. In order to obviate the necessity of providing A.M. and P.M. designations corresponding to the numerical portion of the hourly entry of time provided by the clock and calendar circuit 27, a twenty-four hour numerical notation is adopted for use in the clock and calendar circuit 27 and, accordingly, in the scanning circuit 29. As shown in the following table, 12:00 noon is represented by the numerical notation 1200 whereas 12:00 midnight is represented by the numerical notation 2400.

| Clock Time in Hours | Printed Time | Number of Pulses Representing Tens Hours Digit | Number of Pulses Representing Units Hours Digit |
|---|---|---|---|
| 1 a.m. | 0100 | 1 | 2 |
| 2 a.m. | 0200 | 1 | 3 |
| 3 a.m. | 0300 | 1 | 4 |
| 4 a.m. | 0400 | 1 | 5 |
| 5 a.m. | 0500 | 1 | 6 |
| 6 a.m. | 0600 | 1 | 7 |
| 7 a.m. | 0700 | 1 | 8 |
| 8 a.m. | 0800 | 1 | 9 |
| 9 a.m. | 0900 | 1 | 10 |
| 10 a.m. | 1000 | 2 | 1 |
| 11 a.m. | 1100 | 2 | 2 |
| 12 Noon | 1200 | 2 | 3 |
| 1 p.m. | 1300 | 2 | 4 |
| 2 p.m. | 1400 | 2 | 5 |
| 3 p.m. | 1500 | 2 | 6 |
| 4 p.m. | 1600 | 2 | 7 |
| 5 p.m. | 1700 | 2 | 8 |
| 6 p.m. | 1800 | 2 | 9 |
| 7 p.m. | 1900 | 2 | 10 |
| 8 p.m. | 2000 | 3 | 1 |
| 9 p.m. | 2100 | 3 | 2 |
| 10 p.m. | 2200 | 3 | 3 |
| 11 p.m. | 2300 | 3 | 4 |
| 12 Midnight | 2400 | 3 | 5 |

Accordingly, each notation representing the hour at which a toll call is terminated comprises a two digit notation, i.e., a tens hours digit and a units hours digit. The position of the wiper 256 with respect to the contacts forming the contact bank 253 represents the tens hours digit. As described hereinabove, when viewed from right to left in FIG. 2 of the drawings, the contacts forming the contact bank 253 represent "0" and the digits "1" and "2." The "0" designating contact in the contact bank 253 is connected to the normally open contacts 451 associated with the first counting relay 450. The remaining contacts representing the digits "1" and "2" are connected to a plurality of normally open contacts 431 and 426, respectively.

As disclosed in the table above, the counting relay chain 400 controls the production of a series of groups of mark pulses in accordance with the magnitude of the digits in the units and tens denomination column of the notation of the hour at which the toll call is terminated. The counting chain 400 is so connected with the output contact banks in the date and time register circuit 28 that a single pulse is representative of "0" and the digits are represented by a group of pulses one greater in number than the magnitude of the digit to be manifested. More particularly, assuming that the call is terminated at 2:17 A.M., a "0" is to be entered in the tens hours denominational column of the notation of the time at which the call is terminated. Therefore, the "0" manifesting or first contact in the contact bank 253 is connected to the normally open contacts 451 controlled by the first relay in the counting chain 400. Since the wiper 256 is grounded at contacts 396 through the uppermost contacts controlled by the relays forming the steering relay circuit 401, the normally open contacts 451 are grounded thereby to indicate that a single pulse representing "0" is to be produced by the scanning circuit 29.

Referring now to the pulse relay 490 and the pulse assist relay 470, as described hereinbefore, these two relays are sequentially operated in the order named in response to the application of a ground pulse to the operating winding of the pulse forming relay 490 from the pulse generator 496. Following the termination of this ground pulse, the pulse forming relay 490 is released to reclose the contacts 491, 492 and 494 and to open the contacts 493 and 495. The opening of the contacts 493 removes ground from the mark pulse conductor 365 so that the mark head 32 in the associated recorder 25 is deenergized, thereby completing the production of a single mark pulse representing "0." The closure of the contacts 494 applies ground through the closed contacts 473 to the advance pulse conductor 363 so that the pulse repeater relay in the one-way trunk circuit is operated to energize the advance magnet 36 in the associated recorder 25, thereby to advance the magnetic tape 30 therein to the next printing position. The grounding of the conductor 363 also energizes a lamp 307 to indicate that the tape 30 is being advanced. The opening of the contacts 495 does not release the pulse assist relay 470 inasmuch as this relay is held operated through the locking circuit provided by the closure of the contacts 475.

The closure of the contacts 391 applies ground from the closed contacts 471 through the plurality of lowermost contacts including a plurality of contacts 429, 436 and 454 to the operating winding of the first counting relay 450. This application of ground operates the counting relay 450 to close a plurality of contacts 451, 452 and 453 and to open the contacts 454. The closure of the contacts 452 precedes the opening of the contacts 454 and the closure of the contacts 451 and 453, and establishes a locking path for the operating winding of the first counting relay 450. This locking path includes the closed contacts 452, a normally closed pair of contacts 433, a normally closed pair of contacts 482, the now closed contacts 492 and 472. This circuit maintains the first counting relay 450 operated when the contacts 454 are opened to interrupt the operating circuit for this relay. The closure of the contacts 453 interconnects the operating winding of a second counting relay 435 with a normally open pair of contacts 483.

The closure of the contacts 451 applies ground from the grounded wiper 256 in the tens hours register circuit 250 to the operating winding of a stop relay 440 to operate this relay. The operation of the stop relay 440 terminates the counting action of the counting chain 400 under the control of the information manifested in the tens hours register circuit 250. Accordingly, the pulse forming relay 490 and the pulse assist relay 470 are sequentially operated and the pulse forming relay 490 is then released to provide the seized trunk recorder with a mark pulse and an advance pulse prior to the operation of each of the counting relays in the counting chain 400. In response to each of these mark and advance operations, a relay in the counting chain 400 is operated. When the operated relay closes an uppermost contact controlled thereby, similar to the contacts 451, which is connected to the grounded contact in the associated register in the date and time register circuit 28, the counting operation of the chain 400 under the control of this register is terminated. In other words, the pulse forming relay and the pulse assist relay 470 transmit a mark pulse to the mark head 32 in the seized recorder 25 and, following this mark pulse, transmit an advance pulse to the advance magnet 36 therein, and thereafter, the release of the pulse forming relay 490 operates the counting chain 400 to determine whether or not an additional pulse representing the next highest digit should be transmitted to the seized recorder 25.

The operation of one of the relays in the counting chain 400 to close the contact, similar to the contacts 451, which is connected to ground through the date and time register circuit 28, operates the stop relay to close a plurality of contacts 441, 442, 443, 446 and to open a pair of contacts 444, thereby terminating the production of the group of mark pulses representing the tens hours digit in the time notation at which the call is terminated. The closure of the contacts 441 and 442 provides a shunt around the contacts 491 and 492, respectively, so that the operated relay in the counting chain 400 is not released in response to the next operation of the pulse forming relay 490.

Since a space pulse is to follow the group to mark pulses representing the first digit transmitted from scanning circuit 29 to the seized recorder 25, the closure of the contacts 443 and the opening of the contacts 444 prepares a circuit for energizing the space pulse conductor 366 and interrupts the circuit for energizing the mark pulse conductor 365, respectively. The closure of the contacts 446 prepares a circuit for operating a relay 330.

Following the operation of the stop relay 440, to terminate the first cycle of counting action by the counting chain 400, another pulse is applied from the generator 496 to the operating winding of the pulse forming relay 490 to operate this relay. The relay 490 in operating opens the contacts 491, 492 and 494 and closes the contacts 493 and 495. The opening of the contacts 491 and 492 produces no useful function at this time inasmuch as the previous closure of the contacts 441 and 442 provides a direct shunt around these contacts from the closed and grounded contacts 471 and 472 to maintain the relay 450 in the counting chain 400 operated.

The opening of the contacts 494 removes ground from the advance pulse conductor 363 so that the advance magnet 36 in the seized recorder 25 is released, thereby terminating the stepping movement of the magnetic tape in the associated recorder, and the lamp 307 is extinguished. The closure of the contacts 493 applies ground through the previously closed contacts 443 to the space pulse conductor 366 which, as described hereinbefore, energizes the space pulse head 34 to produce a local area of magnetization representing a space pulse immediately following the single pulse representing "0" tens hours.

The closure of the contacts 495 applies ground through the closed contacts 446 and the normally closed contacts 343 to the operating winding of the relay 330. This operates the relay 330 to open the contacts 331 and to close a pair of contacts 332. The opening of the contacts 331, although interrupting the primary operating path for the start assist relay 350, does not release this relay inasmuch as the locking path therefore extending through the closed contacts 242, 353, 323 and 315 is still complete. The closure of the contacts 332 applies ground to the operating winding of a relay 340, the other side of which is also connected to ground through the closed contacts 325 so that the relay 340 does not operate.

After a predetermined period of time, the pulse generator 496 terminates the ground pulse applied to the operating winding of the pulse forming relay 490 so that this relay is released to close the contacts 491, 492 and 494 and to open the contacts 493 and 495. The closure of the contacts 491 and 492 produces no useful function at this time inasmuch as the circuits therethrough are maintained complete through the contacts 441 and 442 closed under the control of the stop relay 440. The opening of the contacts 493 removes ground from the space pulse conductor 366 so that the energization of the space head 34 is terminated, thereby completing the production of a space pulse immediately following the first group of mark pulses. The closure of the contacts 494 applies ground through the closed contacts 473 to the advance pulse conductor 363 which, as described hereinbefore, operates the common pulse repeater relay to energize the advance magnet 36 in the associated recorder 25 so that the magnetic tape 30 in this recorder is advanced to the next recording position. The opening of the contacts 495 removes the ground shunt from around the operating winding of the relay 340 so that this relay is operated by a circuit extending from grounded battery through the operating winding of the relay 330, the closed contacts 332, the operating winding of the relay 340, and thence to ground through the closed contacts 325.

The operation of the relay 340, in series with the operating winding of the relay 330, closes a pair of contacts 341 and opens the contacts 342, 343 and 344. The closure of the contacts 341 produces no useful function at this time. The opening of the contacts 343 disconnects the operating windings of the relays 330 and 340 from the contacts 446 controlled by the stop relay 440. The opening of the contacts 344 removes ground from the start conductor extending to the pulse generator 496 so that the pulse generator is rendered inoperative until such time as the scanning circuit 29 is energized to produce a second series of mark pulses representing the units hours digit of the time notation at which the toll call was completed. The opening of the contacts 342 releases the start assist relay 350 inasmuch as the opening of this contact breaks the locking circuit for this relay.

Accordingly, in response to the operation of the stop relay 440, the scanning circuit 29 is operated to provide a space pulse on the magnetic tape 30 of the associated recorder 25 immediately following the group of mark pulses representing the tens hours digit, and thereafter to provide a circuit for energizing the advance magnet 36 in this recorder, so that the magnetic tape 30 therein is advanced to the next recording position to receive the first of a group of mark pulses representing the second digit to be recorded, i.e., the digit representing the units hours designation of the time at which the call was terminated.

The release of the start assist relay 350 in response to the operation of the relay 340 closes the contacts 351, 352 and 357 and open the contacts 353, 354, 356, 358 and 359. The opening of the contacts 359 interrupts the circuit for applying ground to the start conductor of the pulse generator 496 in a second place so that the pulse generator 496 cannot be reoperated in response to the release of the relay 340 preceding the reoperation of the start assist relay 350. The opening of the contacts 358 removes ground from the upper operating winding of the steering relay 480 in the counting chain 400 but produces no useful function at this time. The opening of the contact 354 removes ground from a conductor in the counting chain 400 and also produces no useful function at this time.

The opening of the contacts 356, however, interrupts the locking circuit for the pulse assist relay 470 so that this relay releases. The release of the pulse assist relay 470 opens the contacts 471, 472 and 473 and 475 and closes the contacts 474. The opening of the contacts 471 produces no useful function at this time. The opening of the contacts 473 removes ground from the advance conductor 363 and extinguishes the lamp 307. The opening of the contacts 475 opens the locking path for the pulse assist relay 470 in a second position and thereby conditions the pulse assist relay 470 for operation under the control of the pulse forming relay 490 and the pulse generator 496 during the production of the second group of mark pulses. The closure of the contacts 474 does not reoperate the pulse assist relay 470 inasmuch as the contacts 495 are open.

The opening of the contacts 472 removes ground from the locking circuit of the first counting relay 450 so that this relay releases to open the contacts 451, 452 and 453 and to close the contacts 454. The opening and closing of these contacts in response to the release of the relay 450 conditions the counting chain 400 for controlling the operation of the scanning circuit 29 to produce the next group of mark pulses representing the second digit to be transmitted to the associated trunk recorder. Also, the opening of the contacts 451 removes ground from the operating winding from the stop relay 440 so that this relay releases to open the contacts 441, 442, 443 and 446 and to close the contacts 444.

The opening of the contacts 443 opens a circuit for applying ground to the space pulse conductor 366 which is not grounded because of the release of the pulse forming relay 490. The closure of the contacts 444 prepares a circuit for operating the mark pulse conductor 365 in response to the next operation of the pulse forming relay 490. The opening of the contacts 446 interrupts the circuit for operating the relay 330 in response to the next operation of the pulse forming relay 490.

Therefore, the release of the start assist relay 350 immediately following the operation of the stop relay 440 conditions the pulse forming relay 490, the pulse assist relay 470, the stop relay 440, and the counting chain 400 for operation under the control of the pulses transmitted from the generator 496 during the production of the group of mark pulses representing the next item of information to be transmitted to the associated trunk recorder.

The steering relay circuit 401 is operated in a step-by-step manner in response to each operation of the stop relay 440 so that ground is removed from the wiper in the register of the date and time register circuit 28 which controlled the foregoing production of the first group of mark pulses and, thereafter, is applied to the wiper associated with the register in the date and time register circuit 28 designating the magnitude of the digit which is next to be transmitted by the scanning circuit 29. To accomplish this, in response to the release of the start assist relay 350, the contacts 351 and 352 are closed. The closure of the contacts 351 completes a circuit for operating a first relay 460 in the steering relay circuit 401. This circuit extends from ground through the closed contacts 315, 323 and 351, the plurality of lowermost contacts controlled by the relays forming the steering relay chain 401 including the contacts 448a and 465 to the operating winding of the relay 460 and thence to grounded battery. The operation of the relay 460 opens a plurality of contacts 461 and 465 and closes a plurality of contacts 462, 463 and 464. The closure of the contacts 463 completes a locking circuit for the first relay 460 in the steering relay circuit 401. This locking circuit extends from grounded battery through the operating winding of the relay 460 through the closed contacts 463, 445a, 487, 352, 324, 315 and thence to ground.

The opening of the contacts 465 interrupts the operating circuit for the relay 460 but this relay does not release due to the completion of the locking circuit therefor upon closure of the contacts 463. The closure of the contacts 464 connects the operating winding of a second relay 445 in the steering relay circuit 401 to a normally open pair of contacts 488 thereby to condition this relay for being operated in response to the termination of the production of the group of mark pulses representing the second digit of the time and date information. The opening of the contacts 461 removes ground applied through the normally closed contacts 396 and the remainder of the uppermost contacts controlled by the relays in the steering relay circuit 401 from the wiper 256 in the tens hours register circuit 250 and thereby terminates the control of the scanning circuit 29 by this register circuit. The closure of the contacts 462 applies ground to the wiper 266 in the units hours register circuit 260 so that the next cycle of operation of the counting chain 400 is controlled in accordance with the selective position of this wiper to manifest the magnitude of the digit to be entered in the units hours denominational column of the time notation relating to this completed call. Accordingly, in response to the first operation of the stop relay 440, the first relay 460 in the steering relay circuit 401 is operated to render the tens hours register circuit 250 ineffective to control the operation of the scanning circuit 29 and to render the units hours register circuit 260 effective to control the production of the next group of mark pulses.

Simultaneously with the closure of the contacts 351 and 352 to produce the first operation of the steering relay circuit 401, the contacts 357 are closed. The closure of the contacts 357 applies ground to the battery terminal energizing the serially connected relays 330 and 340 and thereby provides a ground shunt around the operating coils of these relays. Therefore, the relays 330 and 340 release to close the contacts 331, 342, 343 and 344 and to open the contacts 332 and 341. The closure of the contacts 343 prepares a circuit for operating the relay 330 in response to the next operation of the stop relay 440. The closure of the contacts 344 completes a circuit to the open contacts 359 which, upon closure thereof, initiates a new cycle of operation of the generator 496. The opening of the contacts 332 disconnects the operating winding of the relay 340 from the operating winding of the relay 330. The opening of the contacts 341 produces no useful function at this time.

The sequential closure of the contacts 331 and 342 reestablishes not only the primary operating circuit but also prepares the locking circuit for the start assist relay 350. The completion of the operating circuit for the relay 350 operates this relay to open the contacts 351, 352 and 357 and to close the contacts 353, 354, 356, 358 and 359. The closure of the contacts 353 completes the locking circuit for the start assist relay 350. The closure of the contacts 354 applies ground to a conductor in the counting relay chain 400. The closure of the contacts 358 applies ground to the upper operating winding of the steering relay 480 in the counting chain 400. The closure of the contacts 356 prepares the locking circuit for the pulse assist relay 470. The opening of the contacts 357 removes the ground shunt from around the relay 330 so that this relay may be operated in response to the application of ground thereto through the normally closed contacts 343.

The opening of the contacts 352 breaks the previously established locking circuit for the relay 460 in the steering relay circuit 401. However, the relay 460 is not released in response to the opening of the contacts 352 inasmuch as this relay is operated in series with the upper winding of a steering relay 485 in the steering relay circuit 401. This circuit extends from grounded battery through the operating winding of the relay 460, the closed contacts 463 and 445a, the upper operating winding of the steering relay 485, to ground at closed contacts 311. In addition to maintaining the relay 460 operated, this path operates the steering relay 485 to open a plurality of contacts 487 and 489 and to close a plurality of contacts 486 and 488.

The closure of the contacts 486 prepares a locking circuit extending through the lower operating winding of the relay 485 to the now open contacts 352. The closure of the contacts 488 prepares a circuit for operating the relay 445 in response to the next closure of the contacts 351. The opening of the contacts 487 interrupts the circuit extending to the upper operating winding of the steering relay 485 so that upon reclosure of the contacts 351 the relay 460 is released. The opening of the contacts 489 performs no useful function at this time.

The next digit of information to be transmitted to the seized trunk recorder, from the scanning circuit 29, is the units hours digit of the time notation at which the toll call was terminated. To prepare the scanning circuit 29 for transmitting a group of mark pulses representative of this digit, the previous operation of the steering relay circuit 401 removed ground from the wiper 256 in the tens hours register circuit 250 and applied ground to the wiper 266 in the units hours register circuit 260. Assuming the example above, wherein the toll call was terminated at 2:17 A.M., the wiper 266 is positioned in engagement with the third contact in the contact bank 263, which contact is designated by the digit "2." As shown in the above table, the scanning circuit 29 produces three mark pulses to represent the digit "2." To accomplish this, the third contact representing the digit "2" in the contact bank 263 is connected to a normally open pair of contacts 426 controlled by a relay 425 in the counting relay chain 400.

Coincident with the reoperation of the start assist relay 350, the contacts 359 are closed to complete the application of ground to the start conductor of the pulse generator 496. In response to the receipt of this ground pulse, the pulse generator 496 produces a ground pulse which is applied to the operating winding of the pulse forming relay 490 to operate this relay. In operating, the relay 490 opens the contacts 491, 492 and 494 and closes the contacts 493 and 495. The opening of the contacts 491 and 492 produces no useful function at this time. The closure of the contacts 493 applies ground through the closed contacts 444 to the mark pulse conductor 365 to reenergize the mark head to produce a single mark pulse. The opening of the contacts 494 produces no useful function at this time. The closure of the contacts 495 operates the pulse assist relay 470 to close the contacts 471, 472, 473 and 475 and to open the contacts 474. The opening of the contacts 474 and the closure of the contacts 475 breaks the operating circuit and completes the locking circuit for the pulse assist relay 470 as described hereinabove. The closure of the contacts 473 prepares an operating circuit for applying ground to the advance pulse conductor 363. The closure of the contacts 471 and 472 prepares a circuit for initiating another cycle of operation of the counting relay chain 400 under the control of the units hours register circuit 260.

Following a predetermined period of time, the pulse generator 496 terminates the ground pulse applied to the pulse forming relay 490 so that this relay releases to close the contacts 491, 492 and 494 and to open the contacts 493 and 495. The opening of the contacts 495 produces no useful function at this time inasmuch as the pulse assist relay 470 is maintained operated through the locking circuit extending to the closed contacts 475. The closure of the contacts 494 applies ground to the advance pulse conductor 363 so that the advance magnet 36 in the associated trunk recorder is operated to step the magnetic tape therein to the next recording position. The opening of the contacts 493 terminates the ground pulse applied to the mark pulse conductor 365.

The closure of the contacts 491 completes the operating circuit for the first counting relay 450 in the counting relay chain 400, as described hereinabove, so that this relay operates to close the contacts 451, 452 and 453 and to open the contacts 454. The closure of the contacts 452, as described hereinabove, completes a locking circuit for the first counting relay 450 which extends through the closed contacts 492 to ground through the closed contacts 472. The closure of the contacts 453 connects the operating winding of the second counting relay 435 to the open contacts 483. The opening of the contacts 454 interrupts the energizing winding of the first counting relay 450, but this relay does not release inasmuch as the closure of the contacts 452 completes the locking circuit therefore. The closure of the contacts 451 does not energize the stop relay 440 inasmuch as ground is not applied to this contact by the date and time register circuit 28.

After a predetermined period of time, the pulse generator 496 again applies ground to the operating winding of the pulse forming relay 490 to operate this relay, thereby to close the contacts 493 and 495 and to open the contacts 491, 492 and 494. The opening of the contacts 494 terminates the application of the ground to the advance conductor 363, and the closure of the contacts 493 applies ground to the mark pulse conductor 365 so that the mark head in the seized recorder is reenergized to produce a second mark pulse in the group representing the magnitude of the digit in the units hours denominational column of the notation of the time at which this toll call was completed. The closure of the contacts 495 produces no useful function inasmuch as the pulse assist relay 470 is maintained operated through the locking circuit extending through the closed contacts 475. The opening of the contacts 491 removes ground from counting chain 400. The opening of the contacts 492 removes ground from one side of the upper operating winding of the steering relay 480 in the counting chain 400. The opening of the contacts 492 also removes ground from the previously described locking circuit for the first counting relay 450 in the counting chain 400. However, this relay is not released in response to the opening of the contacts 492 inasmuch as this relay operates in series with the upper operating winding of the steering relay 480 so that the first counting relay 450 is maintained operated and the steering relay 480 is operated. This circuit extends from grounded battery at the operating winding of the first counting relay 450 through the contacts 452 and 433 to the upper operating winding of the steering relay 480 and to ground through the closed contacts 358.

The operation of the steering relay 480 closes the contacts 481 and 483 and opens the contacts 482 and 484. The closure of the contacts 481 prepares a locking path for the lower operating winding of the steering relay 480. The opening of the contacts 482 interrupts, at another point, the locking circuit for the first counting relay 450. The closure of the contacts 483 prepares a path for operating the second counting relay 435 through the now closed contacts 453. The opening of the contacts 484 disconnects the contacts 491 from a common conductor in the counting chain 400 and produces no useful function at this time.

Following a predetermined period of time, the pulse generator 496 removes ground from the operating winding of the pulse forming relay 490 so that this relay releases to close the contacts 491, 492 and 494, and to open the contacts 493 and 495. The opening of the contacts 495 removes ground from the pulse conductor 365, thereby terminating the second mark pulse on the magnetic tape of the seized recorder. The closure of the contacts 494 applies ground to the advance conductor 363 so that the advance magnet in the seized recorder is energized to advance the tape to the next recording position. The opening of the contacts 495 produces no useful function at this time. The closure of the contacts 491 operates the second counting relay 435 through a circuit extending from grounded contacts 471 through contacts 491, 483 and 453.

The operation of the relay 435 closes the contacts 431, 432 and 434 and opens a pair of contacts 436 and 433. The closure of the contacts 432 completes a locking circuit for the second counting relay 435 which extends from grounded battery through the operating winding of the relay 435, and through the closed contacts 432 to the closed contacts 354 controlled by the start assist relay 350. The opening of the contacts 433 breaks the locking circuit for the first counting relay 450 so that this relay releases. The opening of the contacts 433, in addition to breaking the locking circuit for the first counting relay 450, also removes battery from the upper operating winding of the steering relay 480. However, this relay does not release at this time, inasmuch as the closure of the contacts 492 simultaneous with the closure of the contacts 491 applies ground through closed contacts 472 and closed contacts 481 to energize the lower operating winding of the steering relay 480, thereby completing a locking circuit for maintaining this relay operated.

The closure of the contacts 434 prepares an operating circuit for the third counting relay 425 in the counting chain 400, which operating circuit extends to the now open contacts 484. The opening of the contacts 436 produces no useful function at this time. The closure of the contacts 431 also produces no useful function at this time inasmuch as this contact is not grounded by the date and time register circuit 28.

The pulse generator 496 thereupon reapplies ground to the operating winding of the pulse forming relay 490 so that this relay operates to open the contacts 491, 492 and 494 and to close the contacts 493 and 495. The opening of the contacts 494 terminates the application of ground to the advance pulse conductors 363 and the closure of the contacts 493 reapplies ground to the mark pulse conductor 365, thereby to initiate the production of a third mark pulse on the magnetic tape in the associated recorder representing the magnitude of the digit to be entered in the units hours denominational column of the time notation at which the toll call was terminated. The opening of the contacts 495 produces no useful function.

The opening of the contacts 492 breaks the locking circuit for the lower operating winding of the steering relay 480 in the counting chain 400 so that this relay releases to open the contacts 481 and 483 and to close the contacts 482 and 484. The opening of the contacts 481 breaks the locking circuit or operating circuit for the steering relay 480 in a second place. The closure of the contacts 482 prepares a circuit for locking up the relay 425 when this relay is operated. The opening of the contacts 483 opens one operating path for alternate relays in the counting chain 400. The closure of the contacts 484 prepares a path for operating the counting relay 425 in response to the next closure of the contacts 491. Accordingly, the release of the steering relay 480 conditions a path for operating the next successive relay in the counting chain 400, and also prepares a locking path for maintaining the next operated relay in the counting chain 400 operated.

Thereafter, the pulse generator 496 removes ground from the operating winding of the pulse forming relay 490 so that this relay releases to close the contacts 491, 492, 494 and to open the contacts 493 and 495. The opening of the contacts 493 and the closure of the contacts 494 removes ground from the mark pulse conductor 365 and applies ground to the advance pulse conductor 363 so that the recorder is conditioned for another cycle of operation to record the next pulse in the group of mark pulses representing the magnitude of the digit in the units hours denominational column of the time notation at which the call was terminated. The closure of the contacts 491 applies ground through the closed contacts 471, 484 and 434 to operate the third counting relay 425 and thereby to close a plurality of contacts 426, 425a and 428 and to open a plurality of contacts 427 and 429.

The closure of the contacts 425a precedes the opening and closing of the other contacts controlled by the relay 425 and completes a locking circuit for this relay. This circuit extends from grounded battery to the operating winding of the relay 425 and thence through the closed contacts 425a, 418, 482 and 492 to ground through the contacts 472. This circuit maintains the relay 425 operated when the opening of the contacts 427 under the control of the operation of the third counting relay 425 interrupts the locking circuit for the second counting relay 435 so that this relay releases and opens the contacts 434 through which the third counting relay 425 was operated. The opening of the contacts 429 produces no useful function at this time. The closure of the contacts 428 prepares an operating circuit for a fourth counting relay 415.

The closure of the contacts 426 completes this cycle of the counting chain 400 inasmuch as the contacts 426 are grounded through the wiper 266 in the units hours register circuit 260, thus indicating that the magnitude of the digit to be entered in the units hours denominational column of the time notation is "2." It should be recalled that the counting chain 400 is operated so that three successive relays 450, 435 and 425 are sequentially operated, thus indicating that the pulse forming relay 490 has operated and released three times, thereby to produce three mark pulses on the magnetic tape in the associated recorder. As disclosed in the table above, three mark pulses in the units hours denominational column of the time notation represents a digit having a magnitude of "2." Accordingly, the operation of the third relay in the counting chain 400, following the production of three mark pulses, closes the contacts 426 and terminates this cycle of counting operation by the chain 400.

The closure of the contacts 426 terminates this counting cycle by applying ground to the operating winding of the stop relay 440 so that this relay is operated to close the contacts 441, 442, 443 and 446 and to open the contacts 444. The closure of the contacts 441 and 442 maintains the third counting relay 425 operated inasmuch as the closure of the contacts 442 provides a shunt around the now closed contacts 492. As described hereinabove, the closure of the contacts 443 and the opening of the contacts 444 prepare a path to the space pulse conductor 366 and interrupt the previously prepared path for the mark pulse conductor 365, respectively. The closure of the contacts 446 prepares a path for operating the relay 330.

When the pulse relay 490 is next operated to open the contacts 491, 492 and 494 and to close the contacts 493 and 495 under the control of the pulse generator 496, ground is applied through the closed contacts 443 to produce a space pulse on the magnetic tape in the recorder, thereby indicating that the completion of the second group of mark pulses representative of data from the date and time register circuit 28 has been completed. The opening of the contacts 491 and 492 does not affect the operation of the counting chain 400 inasmuch as the previous closure of the contacts 441 and 442 maintains the locking path for the operated relay in this chain. The closure of the contacts 495 operates the relay 330.

When the ground pulse is terminated by the pulse generator 496, the pulse forming relay 490 releases to close the contacts 491, 492 and 494 and to open the contacts 493 and 495. The opening of the contacts 493 terminates the energizing circuit for the space head in the associated recorder, thereby completing the production of a single space pulse following the second group of mark pulses, and the closure of the contacts 494 applies ground to the advance pulse conductor 363 so that the magnetic tape is advanced to the next recording position. The opening of the contacts 495 removes the ground shunt from around the operating winding of the relay 340 so that, as described in detail hereinabove, the relays 330 and 340 operate in series to close the contacts 341 and to open the contacts 342, 343 and 344. The opening of the contacts 344 removes ground from the start conductor of the pulse generator 496 so that this generator is stopped. The opening of the contacts 342 breaks the locking circuit for the start assist relay 350 so that this relay releases. The opening of the contacts 343 and the closure of the contacts 341 produce no useful function at this time.

The release of the start assist relay 350 closes the contacts 351, 352 and 357 and opens the contacts 353, 354, 356, 358 and 359. The opening of the contacts 354 and 358 remove ground from two common locking circuits in the counting chain 400 but produce no useful function at this time inasmuch as the third counting relay 425 is maintained operated through the locking circuit extending to ground through the closed contacts 482, 442 and 472. The opening of the contacts 359 opens the operating circuit for the pulse generator 496 in a second place. The opening of the contacts 353 interrupts the locking circuit for the start assist relay 350 at a second point.

The opening of the contacts 356 breaks the locking circuit for the pulse assist relay 470 so that this relay releases to open the contacts 471, 472, 473 and 475 and to close the contacts 474. The opening of the contacts 472 breaks the locking path for maintaining the third counting relay 425 operated so that this relay releases, thereby conditioning the counting chain 400 for another cycle of operation under the control of the date and time register circuit 28. The opening of the contacts 475 interrupts the locking path for the pulse assist relay 470 and the closure of the contacts 474 completes an operating path for this relay. The opening of the contacts 473 removes ground from the advance pulse conductor 363 to condition the advance magnet in the seized recorder for another cycle of operation.

The closure of the contacts 357 in response to the release of the start assist relay 350 applies a ground shunt around the operating windings of the serially operated relays 330 and 340 so that these relays release to condition the scanning circuit 29 for another cycle of operation. Simultaneously with releasing the relays 330 and 340, the closure of the contacts 351 and 352 operates the second counting relay in the steering relay circuit 401. The relay 445 is operated over a circuit extending from ground at closed contacts 315 through the contacts 323, 351, 488, 464 and through the operating winding of the relay 445 to battery. The operation of the relay 445 opens the contacts 447, 445a and 448a and closes the contacts 448, 449 and 447a.

The closure of the contacts 449 completes a locking circuit for the relay 445 which extends to the closed and grounded contacts 312. The opening of the contacts 445a interrupts the locking circuit for the first relay 460 in the steering relay chain 401 so that this relay releases. In releasing, this relay opens the contacts 463 thereby removing battery from the previous circuit for serially operating the relays 460 and 485. However, the steering relay 485 remains operated inasmuch as the closure of the contacts 352 completes a locking circuit extending from grounded and closed contacts 315, through the contacts 324, 352 and 386, and the lower operating winding of the steering relay 485. The release of the relay 460 closes the contacts 461 to condition a circuit for applying ground to the wiper 256 in the tens hours register circuit 250. However, ground is not applied to this wiper inasmuch as the previous operation of the second relay 445 in the steering relay chain 401 opens the contacts 447, thereby removing ground from the contacts 461.

The closure of the contacts 448 simultaneously with the opening of the contacts 447 applies ground to the wiper 276 in the tens minutes register circuit 270. The closure of the contacts 447a prepares an operating circuit for a third relay 430 in the steering relay circuit 401. The opening of the contacts 448a, interrupts the energizing circuit for the operating winding of the first counting relay 460 so that this relay is not reoperated under the control of the start assist relay 350.

The release of the relays 330 and 340, as described hereinabove, in response to the closure of the contacts 357 reestablishes the operating circuit for the start assist relay 350 so that this relay operates to open the contacts 351, 352 and 357 and to close the contacts 353, 354, 356, 358 and 359. The opening of the contacts 351 serves no useful function at this time. The opening of the contacts 352 removes ground from the lower operating winding of the steering relay 485 so that this relay releases to open the contacts 486 and 488 and to close the contacts 487 and 489. The opening of the contacts 486 opens the operating circuit for the lower operating winding of the steering relay 485. The closure of the contacts 487 prepares a locking circuit for the next unoperated relay in the steering relay chain 401. The opening of the contacts 488 breaks the operating circuit for the relay 445 at a second place, and the closure of the contacts 489 prepares a circuit for operating the relay 430.

Accordingly, in response to the second operation of the stop relay 440 to terminate the production of the group of mark pulses representing the units hours digit, the start assist relay 350 is released and reoperated, thereby initiating another stepping operation in the steering relay circuit 401 so that ground is removed from the wiper 266 in the units hours register circuit 260 and is applied to the wiper 276 in the tens minutes register circuit 270 whereby the next cycle of operation of the counting chain 400 in the scanning circuit 29 is under the control of the tens minutes register circuit 270 in the date and time register circuit 28. Therefore, the next group of pulses recorded on the magnetic tape in the associated trunk recorder is representative of the magnitude of the digit to be entered in the tens minutes denominational column of the time notation at which this particular call was terminated. The stop relay 440 is released in response to the release of the pulse assist relay 470 so that the contacts 441, 442, 443 and 446 are opened and the contacts 444 are closed thereby to condition the scanning circuit 29 for operation under the control of the tens minutes register circuit 270 in the date and time register circuit 28.

As shown in the following table, the portion of the time notation relating to the time at which the toll call is completed, which is to be expressed in minutes, includes the notations "01" to "59," inclusive. The production of mark pulses to represent these numerical designations of clock time in minutes utilizes a single mark pulse to represent "0" and ten mark pulses to represent the digit "9." For instance, if the time of termination is twenty-one minutes after a particular hour, the wiper 276 in the tens minutes register circuit 270 is in engagement with the third contact in the contact bank 273, and this contact is connected to the uppermost contacts 426 controlled by the counting relay 425, the operation of which indicates the production of three mark pulses. The same is true in the units minutes register circuit 280. Again assuming that the call was terminated at twenty-one minutes after a given hour, the wiper 286 is in engagement with the second contact in the contact bank 283. This contact is connected to the contacts 431, controlled by the second counting relay 435, so that when this relay is operated following the production of two mark pulses by the pulse forming relay 490 the stop relay 440 is operated to terminate the production of mark pulses representing the magnitude of the digit in the units minutes denominational column.

| Clock Time in Minutes | Printed Designation of Time in Minutes | Number of Mark Pulses Representing Tens Minutes Digit | Number of Mark Pulses Representing Units Minutes Digit |
|---|---|---|---|
| 1 | 01 | 1 | 2 |
| 2 | 02 | 1 | 3 |
| 3 | 03 | 1 | 4 |
| 10 | 10 | 2 | 1 |
| 11 | 11 | 2 | 2 |
| * | * | * | * |
| 20 | 20 | 3 | 1 |
| 21 | 21 | 3 | 2 |
| * | * | * | * |
| 30 | 30 | 4 | 1 |
| 31 | 31 | 4 | 2 |
| * | * | * | * |
| 40 | 40 | 5 | 1 |
| 41 | 41 | 5 | 2 |
| * | * | * | * |
| 50 | 50 | 6 | 1 |
| 51 | 51 | 6 | 2 |
| * | * | * | * |
| 59 | 59 | 6 | 10 |

In accordance with the assumption above, wherein this toll call is assumed to have terminated at 2:17 A.M., the third group of mark pulses represents the tens minutes digit "1." To represent this digit, the wiper 276 in the tens minutes register circuit 270 is positioned on the second contact in the contact bank 273. This contact is directly connected to the now open contacts 431 controlled by the second stepping relay 435 in the counting chain 400.

Following the closure of the contacts 359, the pulse generator 496 is reenergized to produce sequential operation and release of the pulse forming relay 490. Under the control of the pulses produced by the relay 490, the counting chain 400 is operated, so that the first relay 450 is operated and released, thereby indicating that a first mark pulse has been recorded on the magnetic tape in the associated recorder. Thereafter, the second counting relay 435 in the counting chain 400 is operated. The operation of this relay closes the contacts 431 so that the stop relay 440 is operated to terminate the production of the third group of mark pulses containing two discrete pulses representing a digit having a magnitude of "1" which is representative of the magnitude of the digit in the tens minutes denominational column of the time notation at which the call was terminated.

Following the operation of the second counting relay 435, the pulse forming relay 490, the pulse assist relay 470, the relays 330 and 340, and the stop relay 440 are operated and released and the start assist relay 350 is released and then operated to complete the production of the third group of mark pulses followed by a single space pulse. During this opeation, the release and subsequent reoperation of the start assist relay 350 energizes the steering relay circuit 401 so that the relay 445 is released and the relay 430 is operated. The operation of the relay 430 closes a pair of contacts 430a so that ground is applied through the closed contacts 396 to the wiper 286 in the units minutes register circuit 280 of the date and time register circuit 28. Accordingly, following the production of the third group of mark pulses representing the tens minutes digit, the date and time register circuit 28 is rendered effective to control the operation of the scanning circuit 29 in accordance with the magnitude of the digit to be entered in the units minutes denominational column of the time notation at which the toll call was completed.

In accordance with the above assumption, wherein the time of termination of the call was set at 2:17 A.M., the wiper 286 is in engagement with the eighth contact in the contact bank 283, which contact manifests the digit "7." This contact is connected to the uppermost contact controlled by the counting relay 380 in the counting chain 400. Accordingly, when the pulse generator 496 is again rendered effective in response to the operation of the start assist relay 350 to close the contacts 359, the counting chain 400 is rendered effective to sequentially operate and release all of the relays 450, 435, 425, 415, 405, 390, 385 and 380, thereby indicating the production of eight mark pulses by the pulse forming relay 490.

In response to the operation of the counting relay 380 following the production of eight pulses representing the digit "7," the stop relay 440 is operated to initiate a resetting cycle identical to that described above in conjunction with the description of the production of groups of mark pulses representing the tens hours, units hours, and tens minutes digits so that the fourth group of mark pulses is followed by a space pulse.

Incident to this resetting operation, the start assist relay 350 is released and reoperated so that a relay 420 in the steering circuit 401 is operated to close a pair of contacts 421. The closure of the contacts 421 applies ground through the normally closed contacts 396 to the wiper 166 in the months register circuit 160. As shown in the following table, the months are designated numerically by the designations "01" to "12," inclusive, which correspond to the months of January to December, respectively. Also, as shown in the following table, the magnitude of the digits forming the numerical designation is represented by an equal number of mark pulses. For instance, assuming the call to have been terminated on the twenty-first day of June, the printed representation of the month is "06" and this designation is recorded in the form of six separate mark pulses. As discussed hereinabove, during the month of June the wiper 166 is in engagement with the sixth contact in the contact bank 165, and, since this contact is to control the production of six mark pulses, it is connected to the uppermost contact controlled by the sixth relay in the counting chain 400. This is distinguished from the production of the groups of mark pulses representing the time on which the call was completed inasmuch as a single pulse therein is utilized to represent "0," whereas in the months register circuit 160 a single pulse represented by the first contact is utilized to represent the digit "1." Accordingly, the contact representing the month of June in the months register circuit 160 is grounded under the control of the steering circuit 401 and is connected to the uppermost contact controlled by the relay 390.

| Month | Printed Designation of month | Number of Pulses Representing Months Designation |
|---|---|---|
| January | 01 | 1 |
| February | 02 | 2 |
| March | 03 | 3 |
| April | 04 | 4 |
| May | 05 | 5 |
| June | 06 | 6 |
| July | 07 | 7 |
| August | 08 | 8 |
| September | 09 | 9 |
| October | 10 | 10 |
| November | 11 | 11 |
| December | 12 | 12 |

In response to the operation of the start assist relay 350, following the actuation of the steering relay circuit 401 to operate the relay 420 thereby conditioning the months register circuit 160 for controlling the operation of the scanning circuit 29, the pulse generator 496 is rendered effective to operate the pulse forming relay 490. The pulse forming relay 490 is operated and released six times to ground the mark pulse conductor 365 six times. Coincident with these operations of the pulse forming relay 490, the relays 450, 435, 425, 415, 405 and 390 in the counting relay chain 400 are sequentially operated and released, thus indicating that six pulses have been produced by the pulse forming relay 490. The operation of the counting relay 390 closes the uppermost contact controlled thereby so that ground is applied to the operating winding of the stop relay 440. The operation of the stop relay 440 initiates a resetting operation of the scanning circuit 29, in the manner described above in detail, thereby to complete the production of the fifth group of mark pulses representing the month during which the toll call was terminated.

Coincident to this resetting operation, the start assist relay 350 is released and reoperated. The release of the start assist relay 350 operates the steering relay chain 401 so that a relay 410 is operated to close a pair of contacts 411 controlled thereby. The closure of the contacts 411 applies ground to the wiper 176 in the tens days register circuit 170 of the date and time register circuit 28. Coincident to this application of ground to the wiper 176, the months register circuit 160 is disabled from controlling the production of mark pulses by the scanning circuit 29.

The tens days register circuit 170 and the units days register circuit 180 are interconnected with the counting relay chain 400 in the scanning circuit 29 in the same manner as the tens hours register circuit 250, the units hours register circuit 260, the tens minutes register circuit 270 and the units minutes register circuit 280, so that the magnitude of the digit to be manifested is represented by a group of mark pulses one greater in number than the numerical value of the digit to be entered. This is true inasmuch as a single mark pulse is utilized to represent "0." Accordingly, in view of the assumed date on which the call was completed, i.e. June twenty-first, the wiper 176 is in engagement with the third contact in the contact bank 173. This contact is directly connected to the contacts 426 controlled by the third counting relay 425.

Upon reoperation of the start assist relay 350, the contacts 359 are reclosed to initiate operation of the pulse generator 496. In response to signals received therefrom, the pulse forming relay 490 is operated and released three times to produce three ground pulses on the mark pulse conductor 365, thereby to control production of three mark pulses representing the digit "2" in the group of pulses recorded on the magnetic tape of the associated recorder corresponding to the magnitude of the digit in the tens days denominational column of the notation of the date on which the toll call was completed. Coincident with the operation of the pulse forming relay 490 to produce these mark pulses, the relays 450, 435 and 425 in the counting relay chain 400 are operated. In response to the operation of the relay 425, the contacts 426 are closed to apply ground to the operating winding of the stop relay 440 so that this relay operates.

In response to the operation of the stop relay 440, the scanning circuit 29 is reset to condition this circuit for the production of the seventh group of mark pulses representing the magnitude of the digit to be entered in the units days denominational column of the notation representing the date on which the toll call was terminated. As described hereinabove, the start assist relay 350 is released during the resetting operations. The release of the start assist relay 350 closes the contacts 351, 352 and 357 and opens the contacts 353, 354, 356, 358 and 359. The closure of the contacts 351 and 352 operates a relay 395 in the steering relay circuit 401.

The operation of the relay 395 opens the contacts 396 and closes the contacts 397 and 398. The opening of the contacts 396 removes ground from the wiper 176 in the tens days register circuit 170, and the closure of the contacts 397 applies ground to the wiper 186 in the units days register circuit 180. In accordance with the above assumption wherein this toll call was terminated on the twenty-first day of June, the wiper 186 is in engagement with the second contact in the contact bank 183, and this contact is connected to the normally open contacts 431 controlled by the second counting relay 435 in the counting chain 400 thereby to control the scanning circuit 29 to produce two mark pulses in the group of mark pulses representing the magnitude of the digit to be entered in the units days denominational column.

The closure of the contacts 398 prepares a circuit for operating a code complete relay 300 thereby indicating that all of the items of information relating to the time and date on which a call is completed have been transmitted to the associated trunk recorder.

The following operation of the start assist relay 350 opens the contacts 351, 352 and 357 and closes the contacts 353, 354, 356, 358 and 359. The closure of the contacts 359 initiates operation of the pulse generator 496. In response to pulses produced in the generator 496, the pulse forming relay 490 is operated and released twice thereby applying ground to the mark pulse conductor 365 to produce two discrete mark pulses on the magnetic tape in the recorder. Coincident with the production of the two mark pulses, the first counting relay 450 in the counting chain 400 is operated and released, and the second counting relay 435 is operated to close the contacts 431, 432 and 434 and to open the contacts 433 and 436. The closure of the contacts 431 applies ground to the operating winding of the stop relay 440 so that this relay operates to close the contacts 441, 442, 443 and 446 and to open the contacts 444. Following the operation of the stop relay 440, the pulse generator 496 removes ground from the operating winding of the pulse forming relay 490 so that this relay releases to close the contacts 491, 492 and 494 and to open the contacts 493 and 495. The opening of the contacts 493 removes ground from the mark pulse conductor 365, thereby terminating the production of the second mark pulse in the seventh group of mark pulses produced for recording information relating to the date and time of the completion of the toll call. The closure of the contacts 494 applies ground to the advance pulse conductor 363 so that the advance magnet in the associated recorder is energized to advance the magnetic tape therein to the next recording position.

Following the operation of the stop relay 440 in response to the completion of the production of the last group of mark pulses representing items of information relating to the time and date of completing the call, the pulse generator 496 applies ground to the operating winding of the pulse forming relay 490 to operate this relay to open the contacts 491, 492 and 494 and to close the contacts 493 and 495. The opening of the contacts 492 and 491 does not affect the operated relay in the counting chain 400 inasmuch as the previous closure of the contacts 441 and 442 provides a shunt around these contacts. The closure of the contacts 493 applies ground through the closed contacts 443 to the space pulse conductor 366 so that a space pulse is recorded on the magnetic tape in the recorder immediately following the last group of mark pulses representing the magnitude of the digit to be entered in the units days denominational column of the date notation. The opening of the contacts 494 removes ground from the advance pulse conductor 363 thereby to condition this conductor for the receipt of the next group of advance pulses. The closure of the contacts 495 applies ground through the closed contacts 446 and 343 to operate the relay 330 to open the contacts 331 and to close the contacts 332.

At the termination of this pulse from the generator 496, the pulse forming relay 490 releases to close the contacts 491, 492 and 494 and to open the contacts 493 and 495. The opening of the contacts 493 removes ground from the space pulse conductor 366 so that the energization of the space head in the recorder is terminated. The closure of the contacts 494 connects ground to the advance pulse conductor 363 so that the magnetic tape is advanced to the next recording position. The closure of the contacts 491 and 492 produces no useful function at this time inasmuch as the contacts 441 and 442 have maintained the circuits to the counting chain 400 complete during the operation of the pulse forming relay 490.

The opening of the contacts 495 removes the ground shunt from the operating winding of the relay 340 so that this relay operates in series with the operating winding of the relay 330, thereby to open the contacts 342, 343 and 344 and to close the contacts 341. The opening of the contacts 344 removes ground from the start conductor to the pulse generator 496 so that this generator is rendered inoperative. The opening of the contacts 343 breaks the operating circuit for the relay 330 extending to the contacts 495 of the pulse forming relay 490. The opening of the contacts 342 interrupts the locking circuit for the start assist relay 350.

The closure of the contacts 341 applies ground through the closed contacts 398 to the operating winding of a code complete relay 300 to operate this relay. The relay 300 in operating closes a pair of contacts 301 and opens a plurality of contacts 302, 303 and 304. The opening of the contacts 304 removes ground from the conductor 364, thereby informing the one-way trunk circuit that the information relating to the time and date of the termination of the call has been completely transmitted to the associated trunk recorder, and, accordingly, initiates a dismissing operation in the one-way trunk circuit so that the clock and calendar circuit 27 including the scanning circuit 29 and the date and time register circuit 28 is no longer associated with the trunk recorder in the one-way trunk circuit. Also, the opening of the contacts 304 removes ground from an electric lamp 306 so that this lamp is extinguished, thereby indicating that the code has been completely transmitted to the trunk recorder.

The opening of the contacts 303 interrupts the previously opened circuit to the conductor 362 so that, when the relay 320 is reoperated, a ground pulse is not applied to this conductor. The closure of the contacts 301 connects ground from the closed contacts 315 to the operating winding of the start assist relay 350 so that this relay remains operated even though the contacts 342 are opened to interrupt the locking circuit for this relay.

The opening of the contacts 302 opens the locking circuit for the start relay 310 so that this relay releases to open the contacts 311, 312, 314 and 315 and to close the contacts 313. The opening of the contacts 311 removes ground from the upper operating winding of the steering relay 485 to prevent the steering relay 485 from being operated before the initiation of the next cycle of operation of the scanning circuit 29. The opening of the contacts 314 interrupts the locking circuit for the start relay 310 at a second point. The opening of the contacts 315 removes ground from the contacts 323, 324, 331, and from the operating winding of the start assist relay 350 so that this relay releases. The closure of the contacts 313 operates the relay 320 so that the contacts 323, 324 and 322 are opened and the contacts 321 are closed. The operation of the relay 320 places this relay in condition for the initiation of another cycle of operation in response to the seizure of the scanning circuit 29 by one of the one-way trunk circuits.

The opening of the contacts 312 in response to the release of the start relay 310 removes ground from the operating winding of the last relay 395 in the steering relay circuit 401 so that this relay releases to close the contacts 396 and to open the contacts 397 and 398. The closure of the contacts 396 applies ground to the wiper 256 so that upon initiation of another cycle of operation of the scanning circuit 29, the wiper 256 in the tens hours register circuit 250 is grounded whereby the first group of mark pulses produced by the scanning circuit 29 will be controlled by the tens hours register 250 in the date and time register circuit 28. The opening of the contacts 397 removes ground from the wiper 186 in the units days register circuit 180, thereby terminating the control of this wiper over the production of mark pulses by the scanning circuit 29. The opening of the contacts 397, in removing ground from the wiper 186, also releases the stop relay 440 to open the contacts 441, 442, 443 and 446 and to close the contacts 444. The opening of the contacts 398 removes ground from the operating winding of the code complete relay 400 but, since the code complete relay 400 is slow-to-release, it does not release at this time.

The opening of the contacts 315 in response to the release of the start relay 310 releases the start assist relay 350 so that the contacts 351, 352 and 357 are closed and the contacts 353, 354, 356, 358 and 359 are opened. The closure of the contacts 351 and 352 does not affect the steering relay chain 401 inasmuch as ground has been removed from these contacts because of the opening of the contacts 315. The opening of the contacts 353 opens at a second point, the locking circuit for the start assist relay 350. The opening of the contacts 354 and 358 removes ground from the counting chain 400 so that all of the relays therein are released to condition the counting chain 400 for another cycle of operation in response to the next seizure of the scanning circuit 29 by one of the one-way trunk circuits. The opening of the contacts 356 removes locking ground from the operating winding of the pulse assist relay 470 so that this relay releases to open the contacts 471, 472, 473 and 475 and to close the contacts 474. The opening of the contacts 473 removes ground from the advance pulse conductor 363 thereby completing the advancing movement of the magnetic tape in the recorder. The opening of the contacts 471, 472 and 475 and the closure of the contacts 474 conditions the pulse forming circuit comprising the pulse relay 490 and the pulse assist relay 470 for another cycle of operation under the control of the pulse generator 496 when the scanning circuit 29 is next seized by one of the one-way trunk circuits.

The closure of the contacts 357 in response to the release of the start assist relay 350 applies a ground shunt around the serially connected operating windings of the relays 330 and 340 so that these relays release to close the contacts 331, 342, 343 and 344 and to open the contacts 332 and 341. The release of these relays aids in preparing the scanning circuit 29 for another cycle of operation.

After a suitable time delay, the code complete relay 300 is released to open the contacts 301 and to close the contacts 302, 303 and 304. The opening of the contacts 301 opens at a second point, the locking circuit previously described extending to the operating winding of the start assist relay 350. The closure of the contacts 302 completes an operating circuit for the start relay 310 so that this relay is operated in response to the application of ground to the start conductor 361 the next time one of the one-way trunk circuits desires to receive information pertaining to the date and time of the termination of a toll call. The closure of the contacts 303 prepares a circuit for applying a momentary ground to the conductor 362 to perform the functions described more fully hereinabove. The closure of the contacts 304 applies ground to the conductor 364 so that the one-way trunk circuit is conditioned for another cycle of operation as described in detail hereinabove. Also, the closure of the contacts 304 lights the electric lamp 306 to indicate that the resetting and dismissing of the scanning circuit 29 has been completed.

Accordingly, at this time the scanning circuit 29 is conditioned for another cycle of operation in response to the seizure thereof by one of the one-way trunk circuits to produce seven groups of mark pulses in accordance with the various digits to be recorded on the magnetic tape of the trunk recorder associated with the one-way trunk circuit which seizes the scanning circuit 29. These groups of mark pulses represent the time and date at which the toll call is terminated and are produced under the selective control of the date and time register circuit 28.

In summary, the scanning circuit 29 includes the counting relay chain 400 and the steering relay chain 401 which cooperate under the control of the date and time register circuit 28 to produce a plurality of groups of mark pulses representing the items of information relating to the date and time of the termination of a toll call. More particularly, a single contact controlled by each of the relays forming the counting chain 400 is selectively connected to like positioned contacts in the output contact banks associated with the plurality of registers forming the date and time register circuit 28. These contacts, when selectively closed in response to the production of a predetermined number of pulses, operate the stop relay 440 in the scanning circuit 29 to terminate the production of the groups of mark pulses. Coincident with this termination of the production of the group of mark pulses, the steering relay circuit 401 is energized to operate an additional relay therein to transfer the control over the counting chain 400 from one of the registers in the date and time register circuit 28 to the register circuit wherein is registered the next item of information to be transferred to the associated trunk recorder 25. Obviously the interconnection between the registers in the date and time register circuit 28 and the steering relay chain 401 in the scanning circuit 29 may be varied so that the items of information stored in the registers of the date and time register circuit 28 may be transmitted to the associated trunk recorder in any desired order. Also, although the digits manifested in the plurality of register circuits in the date and time register circuit 28 are represented by groups of mark pulses, as disclosed in the table hereinabove, any type of permutation code or decimal numerical code may be utilized in accordance with the varying demands of commercial application.

While there has been described an embodiment of the present invention, it will be understood that various modifications may be made therein which are within the true spirit and scope of the invention as defined in the appended claims.

What is claimed as new and desired to be secured by Letters Patent of the United States is:

1. In a signaling system of the type including a signaling channel, a plurality of data storing registers, signaling means for transmitting successive groups of data signals separated by control signals under the control of said data storing registers, steering means for sequentially rendering said data storing registers effective to control the operation of said signaling means, signal directing means connected to said signaling means for supplying said data and control signals to said signaling channel, and control means operated following the transmission of each group of data signals for operating said signal directing means to prevent data signals from being supplied to said channel and to enable control signals to be transmitted to said channel.

2. A signaling apparatus comprising a register for storing a digit, signal sending means controlled by said register for transmitting a series of signals in accordance with the value of a digit stored in said register, first and second conductors, relay means connecting said signal sending means to said first conductor so that said transmitted series of signals are applied to said first conductor, means controlled by said register for operating said relay means following the transmission of said series of signals to disconnect said signal sending means from said first conductor and to connect said signal sending means to said second conductor, and means for operating said signal sending means to transmit a control signal over said second conductor following the transmission of said series of signals.

3. A signaling apparatus comprising a digit register for storing a digit and for conditioning one of a plurality of control paths in accordance with the value of the stored digit, counting means including a plurality of devices adapted to be successively operated, each of said devices being connected to one of said control paths, first and second signaling paths, signaling means for supplying signals to said first signaling path representing the value of the stored digit and to said counting means to successively operate said devices, detecting means connected to all of said control paths for rendering said signaling means ineffective to supply signals to said first path and operative to supply a control signal to said second signaling path, and control means controlled by said detecting means for rendering said signaling means ineffective after a control signal has been applied to said second path.

4. The apparatus set forth in claim 3 in which said control means includes means for resetting the devices in said counting means to a normal condition.

5. The apparatus set forth in claim 3 in which means are provided for rendering said signaling means effective to supply signals to said first path when the digit stored in said register is to be transmitted.

6. The apparatus set forth in claim 3 in which the control means includes means for rendering said register ineffective in order to restore the conditioned control path to a normal condition.

7. A signaling system comprising a source of pulses, a signal conductor, an advance conductor, means for directing alternate ones of the pulses from said source to said signal conductor and said advance conductor, a register for storing a digit, a control conductor, means controlled by said register in response to the direction of pulses to said signal conductor representing a stored digit for directing one pulse from said source to said control conductor and another pulse from said source to said advance conductor, and means for then rendering said source of pulses ineffective to supply pulses to any of said conductors.

8. A signaling system comprising a first conductor for receiving signals, a second conductor for receiving advance signals, a pulsing relay intermittently operable to transmit alternate signals to said first and second conductors, switch means for normally connecting said first conductor to a third conductor for receiving digit representing signals, a register for storing a digit, a fourth conductor for receiving control signals, and means controlled by said register following the transmission of a group of signals representing a stored digit for operating said switch means to connect said first conductor to said fourth conductor, said pulsing relay thereafter sequentially transmitting a control signal to said fourth conductor and an advance signal to said second conductor.

9. The signaling system set forth in claim 8 including means operated following the said sequential transmission of a control signal to the fourth conductor and of an advance signal to the second conductor for arresting intermittent operation of said pulsing relay.

10. In a signaling system, a plurality of registers for storing digits, counting means connected to said register, recording means including a pair of recording elements, pulse generating means, first means operated by said pulse generating means and controlled by said counting means and each of said registers in a time spaced sequence for transmitting signals to one of said recording elements in accordance with the value of each of the digits stored in the plurality of registers, and second means operated by said pulse generating means and controlled by said counting means for transmitting a signal to the other of said recording elements following the signals representing each of said digits.

11. The signaling system set forth in claim 10 including circuit means for continuously adjusting said registers to store digits representing instant time, and means for rendering said pulse generating means effective when instant time is to be recorded in said recording means.

12. A signaling system comprising a recording apparatus including data means for recording data on a medium, control signal means for recording control signals on said medium, and advance means for advancing said medium; a register for storing a digit; signal sending means controlled by said register for transmitting alternate signals to said data means and said advance means in accordance with said stored digit; and means controlled by said register in response to the transmission of signals representing said stored digit to said data means for operating said signal sending means to sequentially transmit signals to said control signal means and said advance means.

13. A signaling system comprising a recording apparatus including first and second recording heads disposed adjacent a record medium, a register for storing a digit, counting means connected to said register, means connected to said counting means and said first recording head for operating said counting means to successive digit representing settings and for operating said first head to store signals representing said stored digit on said record medium, and stop means controlled by said register and said counting means and connected to said second recording head for operating said second head to store a control signal on said medium following the storage of said digit representing signals on said medium, said stop means being operated when said counting means is operated to a setting representation of the digit stored in said register.

14. A signaling system comprising a digit storing register, counting means connected to said register, pulse generating means connected to said counting means, a recording device including a record medium, a first recording means disposed adjacent said record medium and connected to said pulse generator, medium advancing means in said recording device and connected to said pulse generating means, means for initiating operation of said pulse generating means to operate said counting means and to alternately operate said first recording means and said medium advancing means so that spaced signals are recorded on said medium representing a digit stored in said register, a second recording means included in said recording device and disposed adjacent said medium, and stop means controlled by said register and said counting means for disconnecting said first recording means from said pulse generating means and for connecting said second recording means thereto so that said second recording means thereto so that said second recording means is operated by said pulse generating means to record a control signal on said medium following said digit representing signals.

15. The signaling system set forth in claim 14 in which said digit storing register comprises a plurality of registers for storing digits, and which includes steering means for sequentially rendering each of said plurality of registers effective to control said stop means, and means controlled by said stop means for operating said steering means.

16. The signaling system set forth in claim 14 including means for continuously adjusting said digit storing register to a manifestation representative of time.

17. The signaling system set forth in claim 14 including means controlled by said stop means for arresting operation of said pulse generating means following the recording of said control signal on said medium.

18. The signaling system set forth in claim 1 including means controlled by said control means for operating said steering means in response to the transmission of each control signal.

19. In a system for transmitting digital data over a signaling path, a data receiver comprising a pair of magnetic heads for storing data on distinct channels of a magnetic member, means for supplying separate groups of signals over said path to one of said heads representing said digital data, means including counting means for generating a control signal at the end of each of said groups of signals, and means for applying said control signal to the other of said heads.

20. In a system for transmitting digits over a signaling path, a magnetic recorder including a magnetic member and a pair of transducing heads disposed adjacent spaced portions of said member for recording signals on distinct channels of said member, means for generating successive groups of signals each representing a digit and for transmitting said groups of signals over said path to be applied to one of said transducing heads for storage on one channel of said magnetic member, a counting means, a pulse source for cyclically operating said counting means in synchronism with the application of each of said groups of signals to said one transducing head, and means controlled by said counting means for applying a signal to the other of said transducing heads to record a signal on the other of said channels separating each of the successive groups of signals stored on said one channel.

21. A signaling system comprising a register for storing a digit, counting means connected to said register, a signal storage device including recording means for recording reproducible signals on a record member, a signaling channel connected to said recording means in said signal storage device, pulse generating means for simultaneously operating said counting means and applying digit representing signals over said signaling channel to said recording means for storage on said member to represent the value of the digit stored in said register, and stop means controlled by said register and said counting chain for preventing the application of digit representing signals to said signaling channel and for applying a control signal over said signaling channel to said recording means for storage on said record member.

22. A signaling system comprising a plurality of registers each adapted to store a digit, counting means connected to all of said registers, first and second conductors, signal storing means including a first recording head connected to said first conductor and a second recording head connected to said second conductor, pulse generating means for simultaneously operating said counting means and transmitting signals over said first conductor to said first head representing one of the stored digits, stop means controlled by said counting means and a selected one of said registers for interrupting the transmission of signals over said first conductor and for transmitting a control signal over said second conductor to said second recording head following the transmission of each of said stored digits, steering means for sequentially rendering each of said registers effective to control said stop means, and means controlled by said stop means for operating said steering means.

References Cited in the file of this patent

UNITED STATES PATENTS

| | | |
|---|---|---|
| 1,282,992 | Vicik | Oct. 29, 1918 |
| 2,355,903 | Blunt | Aug. 15, 1944 |
| 2,543,983 | Ostline | Mar. 6, 1951 |
| 2,581,287 | Ostline | Jan. 1, 1952 |
| 2,680,155 | Molnar | June 1, 1954 |
| 2,689,950 | Bayliss | Sept. 21, 1954 |
| 2,690,474 | Edgar | Sept. 28, 1954 |
| 2,736,006 | Langevin | Feb. 21, 1956 |
| 2,749,535 | Cruess | June 5, 1956 |
| 2,901,734 | Welsh | Aug. 25, 1959 |